United States Patent [19]
Lockett et al.

[11] Patent Number: 5,995,655
[45] Date of Patent: Nov. 30, 1999

[54] SYSTEM AND METHOD FOR CODING COLORS AND STORING COMPENSATION FACTORS USED IN COLOR SPACE CONVERSION

[75] Inventors: David A. Lockett, Los Gatos; Bruce E. Busby, Los Altos, both of Calif.

[73] Assignee: Silicon Graphics, Inc., Mountain View, Calif.

[21] Appl. No.: 09/093,608

[22] Filed: Jun. 9, 1998

[51] Int. Cl.$^6$ ............................... H04N 1/46; G06K 9/00
[52] U.S. Cl. .......................... 382/162; 358/530; 382/167
[58] Field of Search ................................... 358/518, 519, 358/530, 517, 531; 382/167, 162, 166

[56] References Cited

U.S. PATENT DOCUMENTS

| | | | |
|---|---|---|---|
| 5,241,609 | 8/1993 | Hasebe | 382/61 |
| 5,594,558 | 1/1997 | Usami | 358/518 |

*Primary Examiner*—Jerome Grant, II
*Attorney, Agent, or Firm*—Sterne, Kessler, Goldstein & Fox, P.L.L.C.

[57] ABSTRACT

A system and method for coding colors and storing compensation factors used in converting colors from one color space to another color space. A color is converted from a first color space to a second color space using a color space converter. If one or more components of the second color is invalid in the second color space, a constant hue algorithm is used to create a compensated color which is valid in the second colors space. Specifically, a compensation determinator determines a compensation factor which is used in a compensation adjuster along with a constant hue algorithm to create the compensated color triplet. As a result of the constant hue algorithm, one of the color components of the compensated triplet is either zero or saturated. All except two bits of the storage space for the zero or saturated compensated color component are used to store the compensation factor. The other two bits are used to identify whether the color is zero or saturated and to identify the color component used to store the compensation factor. A color coding scheme is employed to identify valid colors from compensated colors and to identify the component used to store the compensation factor. An odd parity (and even, zero parity) is enforced across the LSBs for valid colors, and an even, non-zero parity is enforced across the LSBs for compensated colors. In addition, a value of zero for the LSB of a compensated color component identifies it as the component storing the compensation factor. In another embodiment, two bits of the alpha channel are used to code whether the color is valid, and to identify which color component in the associated triplet contains the compensation factor.

18 Claims, 13 Drawing Sheets

FIG. 13

| ORIGINAL LSB OF EACH COMPONENT | | | PARITY | RECODED LSB OF EACH COMPONENT | | | RESULT OF RECODING | |
|---|---|---|---|---|---|---|---|---|
| R | G | B | | R | G | B | | |
| 0 | 0 | 0 | even, 0 | 0 | 0 | 0 | NO CHANGE | 1310 |
| 0 | 0 | 1 | odd | 0 | 0 | 1 | NO CHANGE | 1312 |
| 0 | 1 | 0 | odd | 0 | 1 | 0 | NO CHANGE | 1314 |
| 0 | 1 | 1 | even | 0 | 1 | 0 | B LSB inverted | 1316 |
| 1 | 0 | 0 | odd | 1 | 0 | 0 | NO CHANGE | 1318 |
| 1 | 0 | 1 | even | 1 | 0 | 0 | B LSB inverted | 1320 |
| 1 | 1 | 0 | even | 1 | 1 | 1 | B LSB inverted | 1322 |
| 1 | 1 | 1 | odd | 1 | 1 | 1 | NO CHANGE | 1324 |

FIG. 14A

| RECODED LSB OF EACH COMPONENT | | | PARITY | RESULT OF RECODING | |
|---|---|---|---|---|---|
| R' | G' | B' | | | |
| 0 | 1 | 1 | even, non zero | R' contains compensation factor | ~1410 |
| 1 | 0 | 1 | even, non zero | G' contains compensation factor | ~1412 |
| 1 | 1 | 0 | even, non zero | B' contains compensation factor | ~1414 |

Columns: 1402, 1404, 1408

FIG. 14B

| MSB<br>X X X X X X X X | LSB+1<br>X | LSB<br>0 | |
|---|---|---|---|
| 8 bit compensation factor | 0=zero<br>1=saturated | indicates this component contains compensation factor | ~1422 |

Columns: 1416, 1418, 1420

SYSTEM AND METHOD FOR CODING COLORS AND STORING COMPENSATION FACTORS USED IN COLOR SPACE CONVERSION

RELATED APPLICATION

This application contains some common disclosure with commonly assigned co-pending U.S. Pat. application Ser. No. 08/566,660 entitled "System and Method for Color Space Conversion" by Masterson et al., filed on Dec. 4, 1995.

BACKGROUND OF THE INVENTION

1. Field of the Invention

The present invention relates generally to displaying video and computer images, and more specifically to an improved system and method for coding colors and storing compensation factors used in converting colors of pixels from one color space to another color space and restoring thereto.

2. Related Art

An image to be displayed on a monitor or television screen is represented by a matrix of points referred to as pixels. The pixels are scanned across the monitor or screen both horizontally and vertically. Each pixel has an associated color that is typically represented by a particular set of values of three different components. The three different components used to represent the color define a color space.

The color space is a mathematical representation of a set of colors. Several color spaces are presently used in various different applications. An RGB color space represents color as levels of red (R), green (G), and blue (B). The RGB color space is generally used in color computer graphics. A YUV color space represents color as intensity (Y) and two color difference components (U, V). The YUV color space is generally used in television equipment and was developed to accommodate both black-and-white and color televisions. Other color spaces include CMYK, HSI, and HSV.

Each color space has been developed according to various industry standards. These standards define a valid range of values for each of the respective components referred to as a valid component range. These standards also define equations and coefficients to be used to convert the color of a pixel from one color space to another color space. For example, conversion between the RGB color space and the YUV color space is accomplished with a well established set of equations.

Conversion of the color between various color spaces is necessary as the lines between computer equipment and television equipment become blurred. For example, multimedia systems employing a computer system to display television images must convert the television image into an image displayable on the computer. The multimedia system must convert the television image from the YUV color space to a computer image in the RGB color space.

One problem associated with this conversion is due to the valid component ranges of the components in the respective color spaces. The valid component ranges in a particular color space can be represented as a rectangular cube in three dimensional space. Each color in the particular color space is defined by a set of three points referred to as a triplet, within the rectangular cube. A triplet having each of its components within the valid component range of the color space, and hence, within the cube of the color space, is referred to as a valid triplet. A triplet having one or more components outside the valid component range of the color space, or outside the cube of the color space, is referred to as an invalid triplet.

A cube representing the RGB color space (RGB cube) lies entirely within a cube representing the YUV color space (YUV cube). Thus, every valid RGB triplet corresponds to a valid YUV triplet. The reverse however, is not true. That is, not every valid YUV triplet corresponds to a valid RGB triplet. This is so because some valid YUV triplets lie outside the RGB cube.

One method that conventional systems have used to address invalid RGB triplets is to clip each invalid component to its maximum (or minimum) value. This method produces an undesirable color shift that, in many cases, is readily apparent to the viewer.

Another method that conventional systems have used to address invalid RGB triplets is to choose RGB values that hold luminance and hue constant and reduce saturation until the invalid RGB triplet becomes valid. This method shifts bright colors to white and dark colors to black. As a result, the overall displayed image becomes more black and white. This effect is also readily apparent to the viewer.

A second problem associated with the conversion of a color between color spaces is due to conventional systems attempting to solve the first problem. Once a conventional system has adjusted, or compensated the invalid RGB triplet to be within the valid RGB component range, the original YUV triplet can not be subsequently recovered from the compensated RGB triplet. Thus, in conventional systems, not only is some color information lost during the conversion, but conventional systems do not provide a means for recovering the lost color information.

The above referenced U.S. Patent Application by Masterson el al. addresses both the first and second problems as described above. Specifically, Masterson el al. addresses the first problem by disclosing a system and method that compensates for invalid colors in the second space by using a constant hue algorithm. This constant hue algorithm blends an invalid color in the second color space with a pure grey color resulting in a valid color in the second color space. The blending adjusts the color's saturation and luminance without affecting the color's hue.

Thus, Masterson et al. discloses a system and method for color space conversion that preserves the quality of the original image with respect to the viewer without undesirable hue shifts introduced by conventional systems.

Additionally, Masterson et al. addresses the second problem by disclosing a system and method that allows the original image to be subsequently recovered without any loss of color information. Specifically, Masterson et al. describes a system and method for storing the compensation factor that can be used to restore the original color in the first color space. Further, a method is described that allows for such storage without requiring additional and costly storage devices. More specifically, Masterson et al. discloses that the compensation factor is stored in the alpha channel.

Generally, the alpha channel is used for storing opacity information. Thus, the solution for storing the compensation factor in the alpha channel is beneficial for systems that do not ordinarily use the alpha channel for storing opacity or other information. However, when the alpha channel is being used, another means to store the compensation factor must be provided. This can be problematic because many existing systems do not have such available storage space. In addition, providing such additional storage space is costly. Accordingly what is needed is a means for storing the compensation factor that can be used in existing systems and which does not require additional and costly storage devices.

SUMMARY OF THE INVENTION

The present invention is directed to an improved system and method for coding colors and for storing compensation factors associated with converted colors, without using additional and costly storage devices. More specifically, compensation factors are stored within the existing storage space reserved for storing color information.

A color is converted from a first color space to a second color space using a color space converter. If one or more components of the second color is invalid in the second color space, a constant hue algorithm is used to create a compensated color which is valid in the second color space. Specifically, a compensation determinator is used to determine a compensation factor, and the compensation factor is used along with the constant hue algorithm to create the compensated color.

As a result of the constant hue algorithm, one of the color components of the compensated triplet is either zero or saturated. That component is used to store the compensation factor. Specifically, the storage space associated with the color component that is zero or saturated is used to store the compensation factor, along with an indication as to whether the original component was zero or saturated.

A color coding scheme is employed to identify valid colors from compensated colors and to identify the component used to store the compensation factor in compensated colors. In a preferred embodiment of the present invention, the least significant bit (LSB) of each component is used for this purpose. Specifically, an odd parity (and even, zero parity) is enforced across the LSBs for valid colors, and an even, non-zero parity is maintained across the LSBs for compensated colors.

In addition, a value of zero for the LSB of a compensated color component identifies it as the component storing the compensation factor. That is, for compensated color triplets an even, non-zero parity is enforced. Accordingly, two components are coded with a value of '1' their LSBs and one component is coded with a value of '0' in its LSB. The component having a value of '0' in its LSB identifies the component used to store the compensation factor. A second bit within the component used to store the compensation factor identifies whether the original component was zero or saturated. The remaining bits contain the compensation factor.

In another embodiment, instead of coding the LSBs of the color components to identify which component stores the compensation factor, two bits of the alpha channel are used to convey the same information. In this manner, the remaining bits in the alpha channel can be used to store opacity information. Specifically, two bits in the alpha channel are used to: (1) identify whether the color is valid, in which case, three valid color values are stored, or (2) identify which color component in the associated triplet contains the compensation factor and the zero/saturated bit.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 13 is a table depicting an example of a coding technique for the least significant bits of valid colors according to the present invention.

FIG. 14A is a table depicting an example of a coding technique for the least significant bits of compensated colors according to the present invention.

FIG. 14B is a table depicting an example of a coding technique for the compensation factor according to the present invention.

DETAILED DESCRIPTION OF THE EMBODIMENTS

Overview

The present invention is directed to an improved system and method for coding colors and for storing compensation factors associated with converted colors, without using additional and costly storage devices. The present invention uses a constant hue algorithm to compensate for a valid color in the first color space that results in a subsequent invalid color in a second space. The constant hue algorithm blends the invalid color in the second color space with a pure grey color resulting in a valid color in the second color space. The blending adjusts the saturation and luminance of the color without affecting the hue. The present invention also determines a compensation factor based on the amount of blending performed by the constant hue algorithm so that the original color in the first color space can be subsequently recovered.

Example Environment

The present invention is now described in terms of an example environment. Specifically, the present invention is described in terms of converting a color in a YUV color space to a corresponding color in an RGB color space. This conversion is useful for converting images between video equipment and computer equipment. Description in these terms is provided for convenience only. It is not intended that the invention be limited to application in this example environment. In fact, after reading the following description, it will become apparent to a person skilled in the relevant art how to implement the invention in alternative environments.

Figure 1:
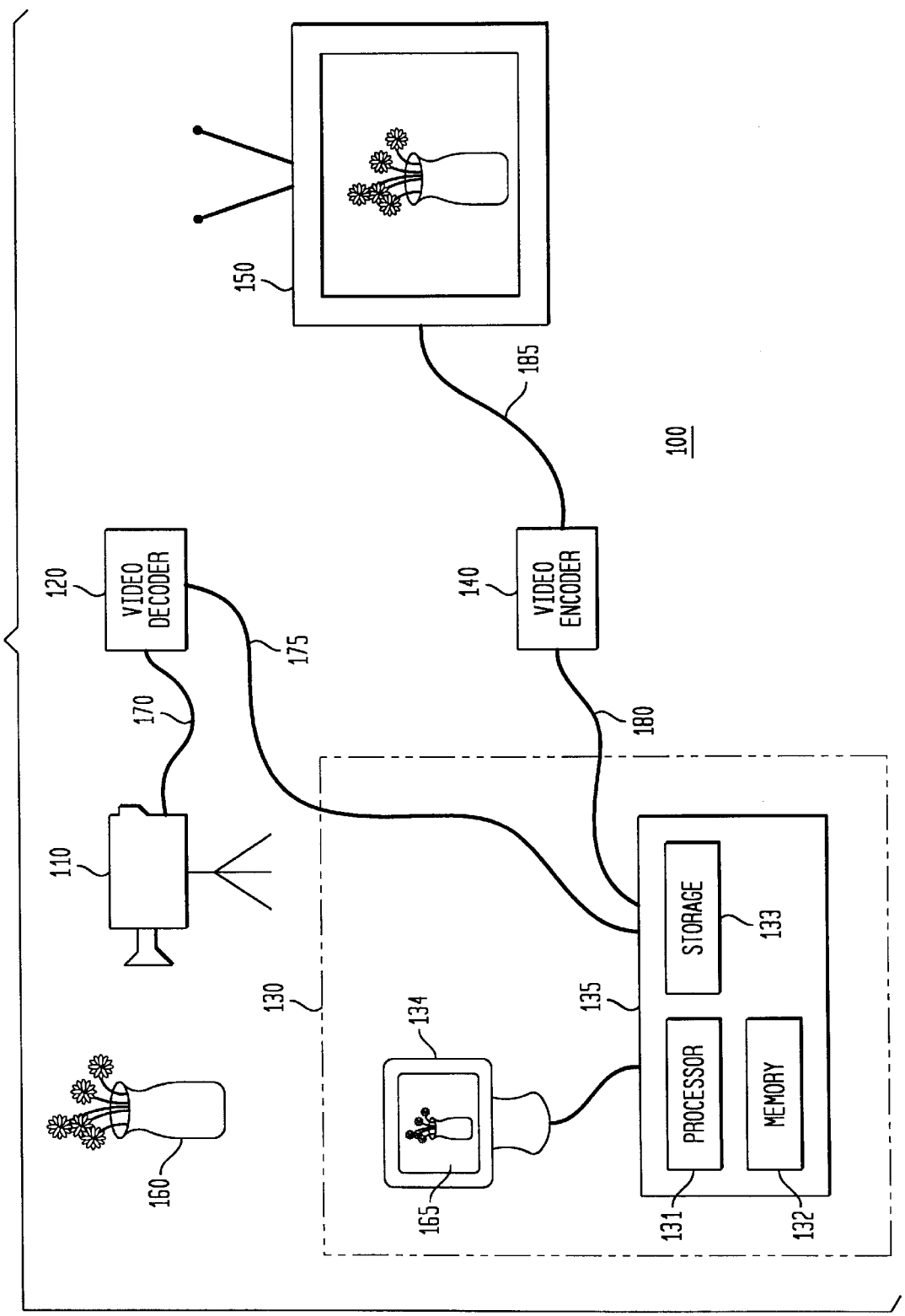
FIG. 1 illustrates a video imaging system that utilizes the present invention.

FIG. 1 illustrates a video imaging system 100 that serves as an example environment for the present invention. Video imaging system 100 includes a video camera 110, a video decoder 120, a computer system 130, a video encoder 140, and a television 150. Computer system 130 includes a general purpose computer 135 including processor 131, a memory 132, and a storage device 133. Computer system 130 also includes a monitor 134.

Video camera 110 creates an optical image of an object 160. Video camera 110 transforms the optical image of object 160 into a video signal 170 representing the optical image. Video decoder 120 receives video signal 170 from video camera 110 and transforms video signal 170 into a computer graphics signal 180 so that computer system 130 can operate upon and display a computer image 165 of object 160 on monitor 134.

Various computer software applications are available that allow a user, operating on computer system 130, to modify and/or alter computer image 165. Such applications allow a user to modify and/or alter computer image 165 in a variety of ways including enhancement, sharpening, blurring, scaling, color correction, painting, and rotoscoping. Once the user has modified computer image 165, the user typically would like to output modified computer image 165 to other video equipment such as television 150. Computer system 130 outputs a computer graphics signal 180 representative of modified computer image 165. However, before television 150 can display modified computer image 165, computer graphics signal 180 must be transformed back into a video signal 185. This is accomplished via video encoder 140. Video encoder 140 receives computer graphics signal 180 from computer system 130 and transforms computer graphics signal 180 into video signal 185.

Color Space Conversions

One aspect of the transformations performed by video decoder 120 and video encoder 140 is to convert colors back and forth between a color representation, i.e., color space, used by video equipment and a color space used by computer equipment. Both types of equipment represent a discrete point in an image as a pixel. One characteristic of the pixel is the pixel's color. Video equipment typically represents color in a YUV color space, while computer equipment typically represents color in a RGB color space. Thus, video decoder 120 must convert a color of pixel represented in the YUV color space into the corresponding color represented in the RGB color space.

Figure 2:
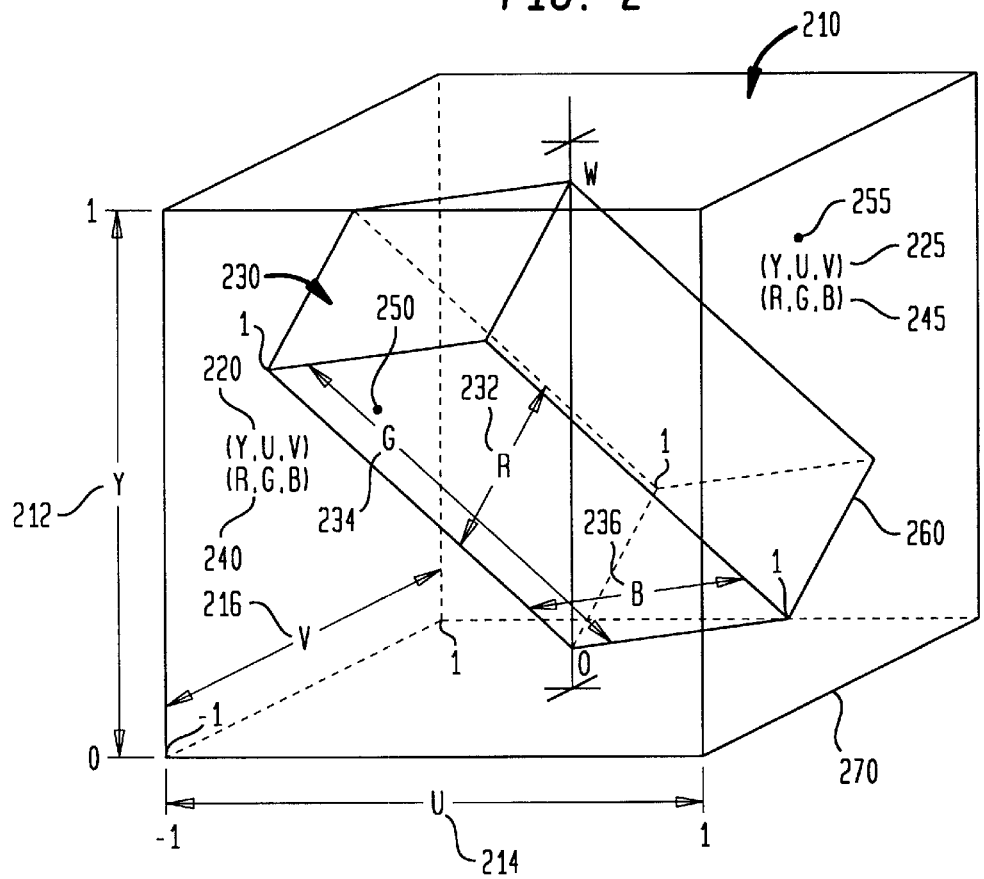
FIG. 2 illustrates typical color spaces used by television equipment and computer equipment.

FIG. 2 illustrates the relationship between a YUV color space 210 and an RGB color space 220. YUV color space 210 is comprised of a luminance component 212 (Y component 212) and two color difference signal components: a first color difference component 214 (U component 214) and a second color difference component 216 (V component 216). The three components, i.e., Y component 212, U component 214, and V component 216, form a YUV triplet 220. YUV triplet 220 represents color 250 in YUV color space 210.

In contrast, computer equipment typically uses a RGB color space 230. RGB color space 230 is comprised of a red component 232® component 232), a green component 234 (G component 234), and a blue component 236 (B component 236). The three components, i.e., R component 232, G component 234, and B component 236, form a RGB triplet 240. RGB triplet 240 represents color 250 in RGB color space 230.

As shown in FIG. 2, RGB color space 230 is represented by an RGB cube 260. RGB cube 260 defines RGB color space 230 in terms of a fixed range of values for each component. This fixed range of values for each component is referred to as a valid component range. Only colors 250 within RGB cube 260 can be validly represented in RGB color space 230. A color outside RGB cube 260, such as color 255, has one or more components outside the valid component range for RGB color space 230. For purposes of this discussion, the valid component range for RGB color space 230 varies between 0 (no amount of the component) and 1 (a maximum amount of the component) for each of R component 232, G component 234, and B component 236. As will be apparent to those skilled in the art, the ranges can be scaled accordingly. Typical systems employing RGB color space 230 represent each value in this range with eight or more bits. A preferred embodiment of the present invention uses ten bits to represent each component in RGB color space 230. Thus, the valid component range for each component in a preferred embodiment is 0 to 1023.

YUV color space 210 is represented by YUV cube 270. Each component in YUV color space 210 also has a valid component range. For purposes of this disclosure, Y component 212 in YUV color space 210 will be described as having a valid component range of 0 to 1, while U component 214 and V component 216 will be described as having a valid component range of −1 to 1. The ranges between RGB color space 230 and YUV color space 210 are not equivalent as a result of the components used in the two color spaces.

FIG. 2 shows that YUV cube 270 is larger that RGB cube 260. In fact, RGB cube 260 is entirely within YUV cube 270. This is due to the choice of multiplication coefficients in the conversion equations. FIG. 2 shows that every RGB triplet 250 having components within the valid component range of RGB color space 230 corresponds to a valid YUV triplet 220 having components within the valid component range of YUV color space 210. In other words, every valid color in RGB color space 230 corresponds to a valid color in YUV color space 210. However, the reverse is not true. Every valid color in YUV color space 210 does not necessarily correspond to a valid color in RGB color space 230. This is best illustrated by the following example. Color 250 can be equivalently represented by either YUV triplet 220 or RGB triplet 240. Color 255 can only be exactly represented by YUV triplet 280. Some adjustment must be made to color 255 in order to approximate color 255 as a valid color in RGB cube 260.

Conversion from YUV Color Space to RGB Color Space

Figure 3:
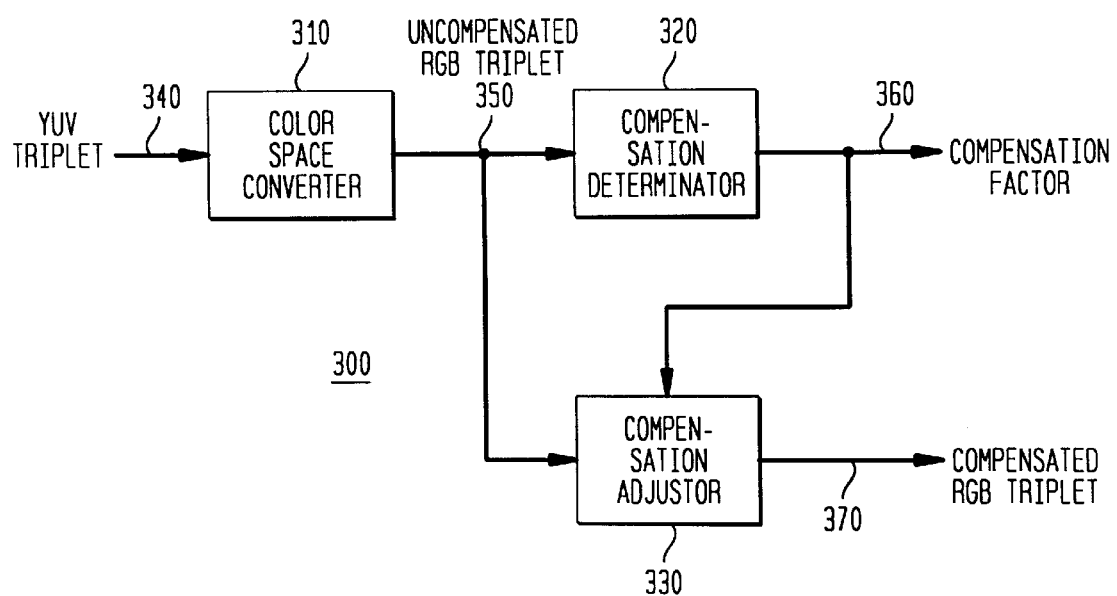
FIG. 3 is a block diagram illustrating a translator useful for performing a conversion from a YUV color space to an RGB color space according to the present invention.
Figure 4:
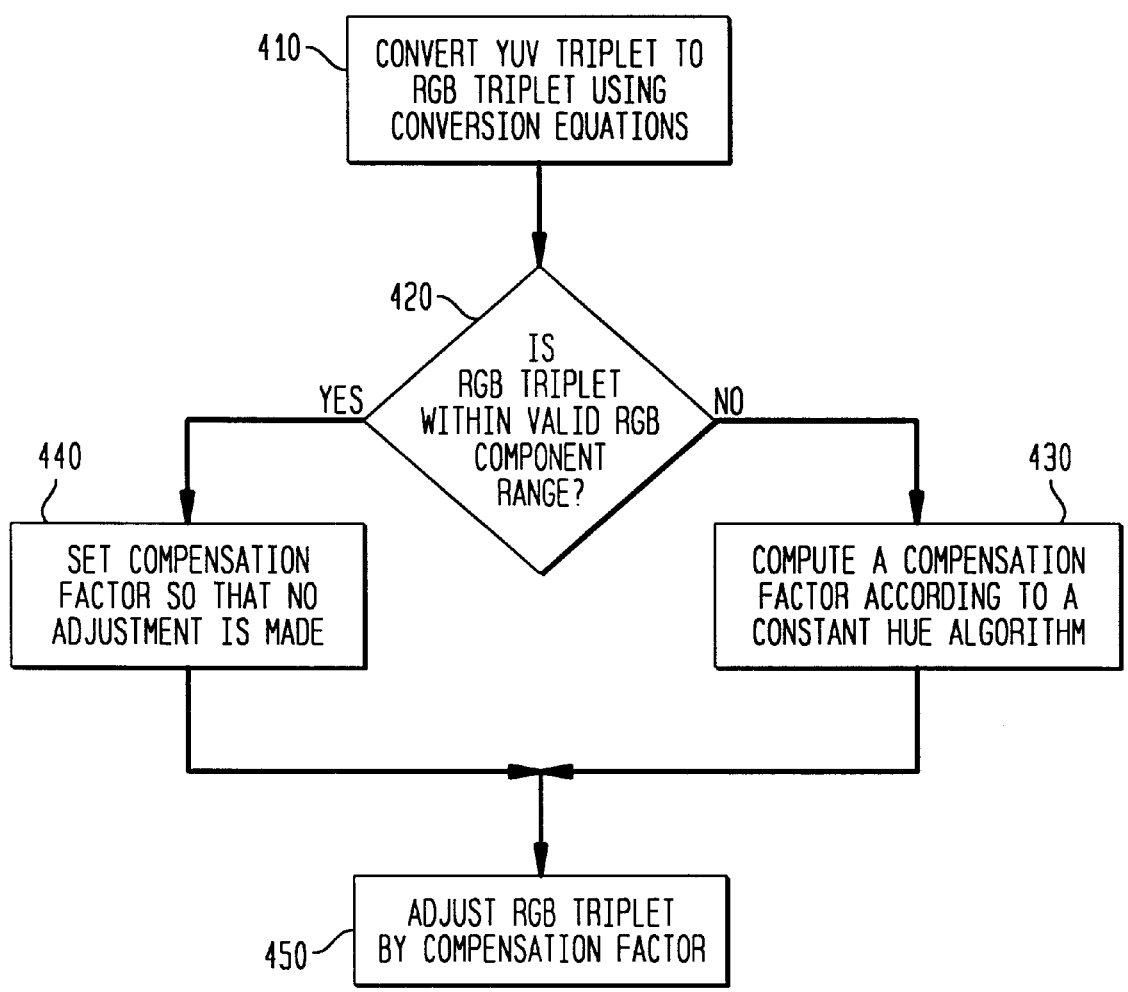
FIG. 4 illustrates the method steps performed while converting a color from a YUV color space to an RGB color space.

FIG. 3 is a block diagram of a translator 300, according to the present invention, useful for performing the conversion of a color from YUV color space 210 to RGB color space 230. Translator 300 includes a color space converter 310, a compensation determinator 320, and a compensation adjustor 330. Translator 300 receives as input a YUV triplet 340. Translator 300 outputs an RGB triplet 370 and a compensation factor 360. FIG. 4 illustrates the method steps performed while converting a color from YUV color space 210 to RGB color space 230. The operation of translator 300 is now described with reference to FIG. 3 and FIG. 4.

In a step 410, color space converter 310 converts YUV triplet 340 into an RGB triplet 350 using conversion equations for converting YUV color space 210 to RGB color space 230. One set of conversion equations are provided below for convenience.

$$R = (2*(1-Cr)*V + Y)), \quad \text{(Eq. 1A)}$$

$$G = Y - (2*Cb*(1-Cb)/Cg)*U - (2*Cr*(1-Cr)/Cg)*V, \quad \text{(Eq. 1B)}$$

and $$B = (2*(1-Cb)*U + Y)), \quad \text{(Eq. 1C)}$$

where
$Cr = 0.299$,
$Cb = 0.114$,
and
$Cg = 0.587$.

The result of applying the conversion equations to YUV triplet 340 results in an uncompensated RGB triplet 350.

In a decision step 420, compensation determinator 320 determines whether uncompensated RGB triplet 350 is within RGB cube 260. Compensation determinator 320 accomplishes this by determining whether each component of uncompensated RGB triplet 350 is within the valid component range of RGB color space 210. If each component of uncompensated RGB triplet 350 is within the valid component range of RGB color space 210, uncompensated RGB triplet 350 is a valid RGB triplet within RGB cube 260 and processing continues at a step 440. Otherwise, uncompensated RGB triplet 350 is an invalid RGB triplet outside of RGB cube 260 and processing continues at a step 430.

In step 440, compensation determinator 320 determines compensation factor 360 so that effectively no adjustment will be made to uncompensated RGB triplet 350 because uncompensated RGB triplet 350 is already a valid RGB triplet. Thus, the present invention only adjusts invalid RGB triplets but determines compensation factor 360 for both valid and invalid RGB triplets. In the preferred embodiment, compensation factor 360 has a range of values between 0 and 1, where compensation factor 360 is set to 1 for uncompensated RGB triplets that are valid RGB triplets.

In step 430, compensation determinator 320 determines a compensation factor 360 according to a constant hue algorithm. A constant hue algorithm adjusts both saturation and luminance while holding hue constant. In effect, the image is blended with a flat grey color to the point where an invalid RGB triplet becomes a valid RGB triplet. The amount of blending required is determined as compensation factor 360. In a preferred embodiment, compensation factor 360 is determined so as to minimize the amount of blending required. The determination of compensation factor 360 is discussed in further detail below. After compensation factor 360 is determined, processing continues at a step 450.

In step 450, compensation adjustor 330 adjusts uncompensated RGB triplet 350 using compensator factor 360. In one embodiment of the present invention, compensation adjustor 330 adjusts uncompensated RGB triplet 350 by multiplying it by compensation factor 360. The result of the multiplication is compensated RGB triplet 370.

In a preferred embodiment of the present invention, the constant hue algorithm is modified to adjust uncompensated RGB triplet 350 so that a pure grey color remains a pure grey color irrespective of the adjustment. A pure grey color is defined by the triplet having components in RGB color space 230 as $(R,G,B)=(0.5,0.5,0.5)$. The modification involves shifting the valid component range of RGB space 230 from the range 0 to 1 to a valid component range of −0.5 to 0.5 prior to adjusting uncompensated RGB triplet 350. This shift effectively ensures that a pure grey color, which is represented as the triplet (0,0,0) after the shift, remains a pure grey color. After compensating uncompensated RGB triplet 350 by compensation factor 360, the valid component range of RGB color space 230 is shifted back to the range 0 to 1.

Figure 5:
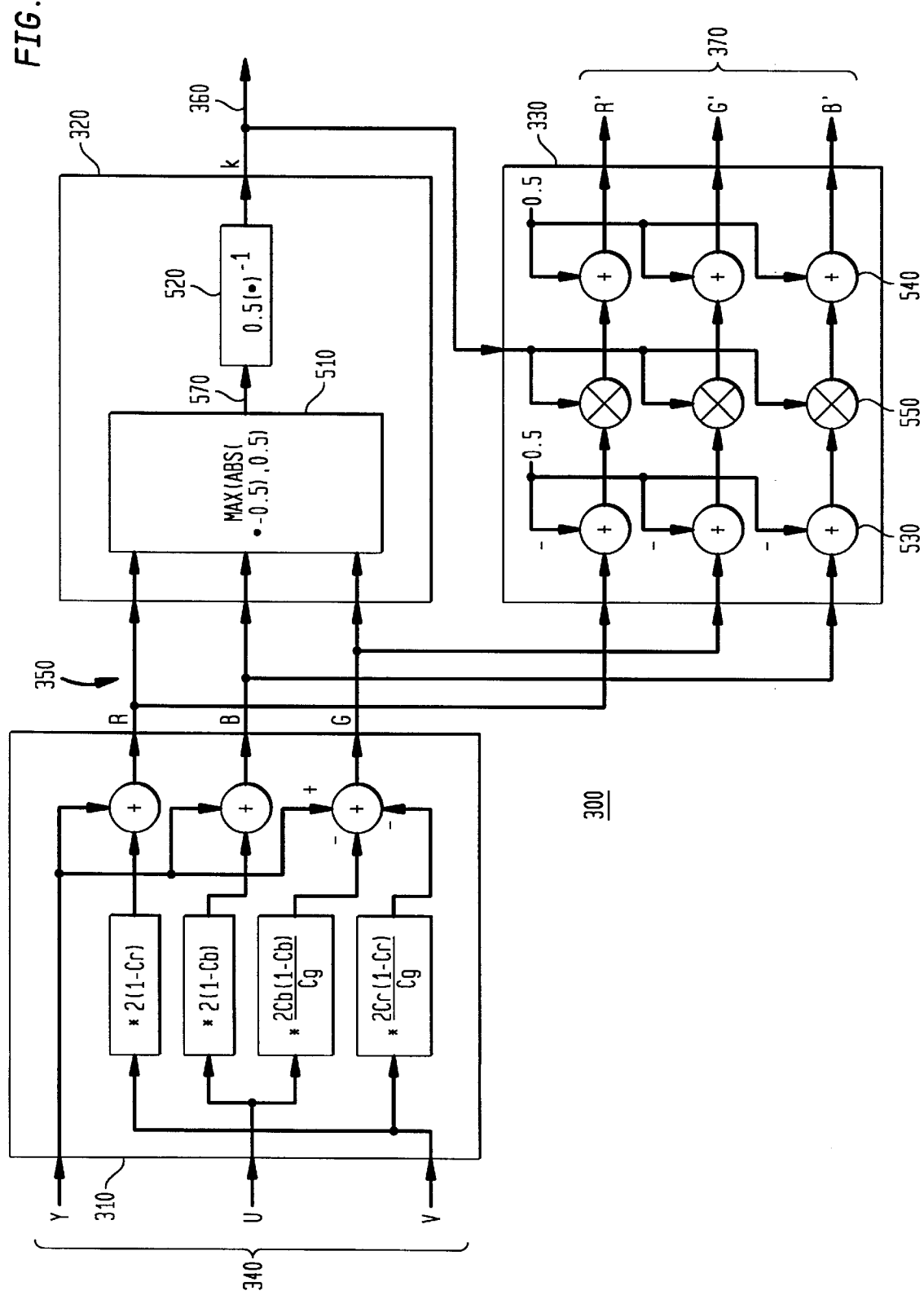
FIG. 5 is a block diagram illustrating one embodiment of a translator for performing the conversion from a YUV color space to an RGB color space according to the present invention.

FIG. 5 is a block diagram illustrating one embodiment of translator 300 according to the present invention in greater detail. Specifically, FIG. 5 illustrates the operations performed by translator 300. These operations can be implemented in a variety of ways. As will be apparent to one skilled in the art, these operations may be implemented in hardware, such as with adders and multipliers, etc., or in hardware lookup tables (LUT). Alternatively, these operations may be implemented in software, firmware, microcode, etc., running on a computer. The present invention applies equally well to both implementations as well as hybrid implementations using both hardware and software.

Color space converter 310, compensation determinator 320, and compensation adjustor 330 are illustrated in FIG. 5 as implementing a specific embodiment of the present invention for converting YUV color space 210 to RGB color space 230. After reading this discussion, other implementations will be readily apparent.

Color space converter 310 includes the operations required to implement Eq. 1 in order to determine uncompensated RGB triplet 350 from YUV triplet 340. Compensation determinator 320 includes a function block 510. In one embodiment of the present invention, function block 510 receives uncompensated RGB triplet 350 and outputs a result according to the following function:

$$f_{510}(R,G,B)=\max(|R-0.5|,|G-0.5|,|B-0.5|,0.5). \quad \text{(Eq. 2)}$$

According to Eq. 2, function block 510 shifts each uncompensated component of RGB triplet 350 by −0.5, determines an absolute value for each shifted component, and returns, as a result 570, the maximum from among these absolutes values and the value 0.5. The value 0.5 exists in function block 510 to accommodate uncompensated RGB triplets 350 that are valid RGB triplets (i.e., when function block 510 returns 0.5, compensation factor 360 will subsequently attain a value of 1.)

Compensation determinator 320 also includes function block 520. In one embodiment of the present invention function block 520 receives result 570 and outputs a result according to the following function:

$$f_{520}(x)=0.5*x^{-1}, \quad \text{(Eq. 3)}$$

where
x is result 570.
According to Eq. 3, function block 520 takes the inverse of result 570 and multiplies the inverse by 0.5. The result of function block 520 is compensation factor 360.

Compensation adjustor 330 includes a first summer bank 530, a multiplier bank 550, and a second summer bank 540. First summer bank 530 performs a shift of each component of uncompensated RGB triplet 350 by −0.5 according to a preferred embodiment of the constant hue algorithm as discussed above. Multiplier bank 550 multiplies the shifted uncompensated RGB triplet by compensation factor 360. Second summer bank 540 performs the shift of shifted compensated RGB triplet by 0.5 to result in compensated RGB triplet 370. The net effect of compensation adjustor 330 is to implement the blending, based on compensation factor 360, of uncompensated RGB triplet 350 with pure grey to result in compensated RGB triplet 370. This effect is represented with the following equation:

$$(R',G',B')=(1-k)*(0.5,0.5,0.5)+k*(R,G,B) \quad \text{(Eq. 4)}$$

where (R',G',B') is compensated RGB triplet 370, (R,G,B) is uncompensated RGB triplet 350, (0.5,0.5,0.5) represents pure grey in RGB color space 230, and k is compensation factor 360.

Figure 6:
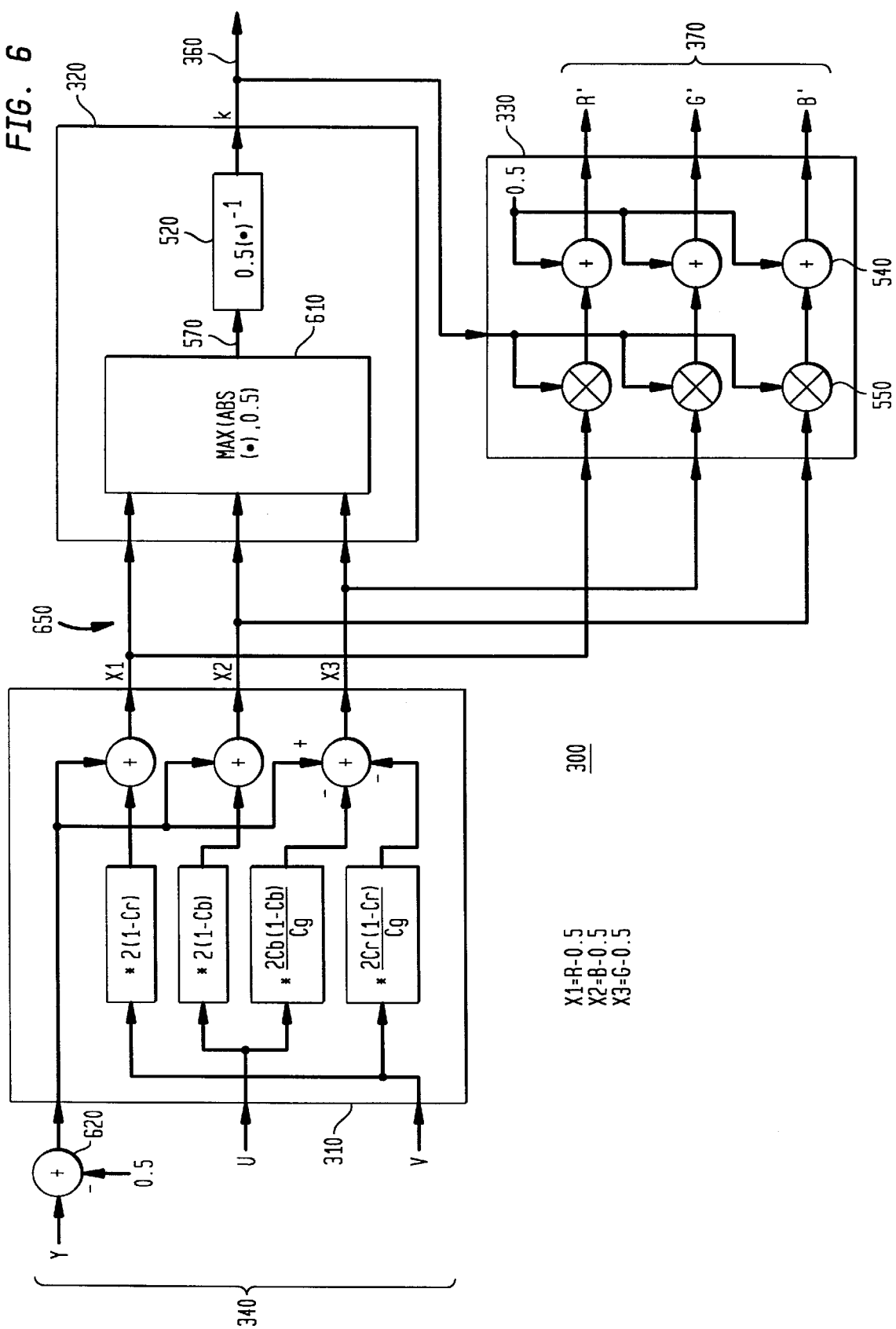
FIG. 6 is a block diagram illustrating a preferred embodiment of a translator for performing the conversion from a YUV color space to an RGB color space according to the present invention.

FIG. 6 is a block diagram illustrating a preferred embodiment of translator 300 according to the present invention greater detail. Specifically, FIG. 6 illustrates some efficiencies obtained in the operations performed by translator 300. A summer 620 is included in the preferred embodiment of translator 300. Summer 620 serves to shift the Y component of YUV triplet 340 by −0.5. The shifted Y component is input to color space converter 310. The output of color space converter 310 is an uncompensated shifted RGB triplet 650 denoted by triplet (X1,X2,X3) where $$X1=R-0.5 \quad \text{(Eq. 5A)}$$

$$X2=B-0.5 \quad \text{(Eq. 5B)}$$

$$X3=G-0.5. \quad \text{(Eq. 5C)}$$

In effect, the presence of summer 620 simplifies two things. First, function block 510 in compensation determinator 320 becomes function block 610. Second, first summer bank 530 in compensation adjustor 330 is eliminated. Each of these simplifications is discussed in further detail below.

Function block 610 receives uncompensated shifted RGB triplet 650 and outputs a result according to the following function:

$$f_{610}(X1,X2,X3)=\max(|X1|,|X2|,|X3|,0.5). \quad \text{(Eq. 6)}$$

According to Eq. 6, function block 610 determines an absolute value for each component of uncompensated shifted RGB triplet 650 and returns, as result 570, the maximum from among these absolutes values and the value 0.5. The rest of compensation determinator 320 remains the same as the embodiment illustrated in FIG. 5.

First summer bank 330 serves to shift uncompensated RGB triplet 350. This is no longer required because summer 620 effectively performs this shift. Thus, first summer bank 330 can be eliminated from compensation adjustor 330. The rest of compensation adjustor 330 remains the same an in the embodiment described with respect to FIG. 5.

Conversion from RGB Color Space back to YUV Color Space

Figure 7:
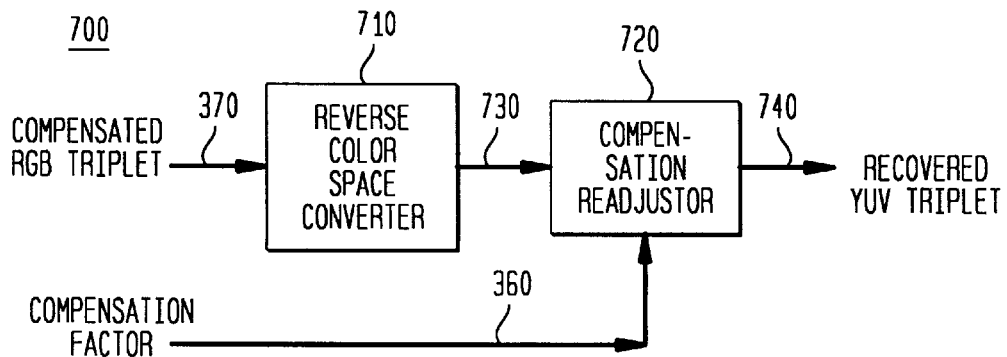
FIG. 7 is a block diagram illustrating a translator useful for performing the conversion from an RGB color space back to YUV color space according to the present invention.
Figure 9:
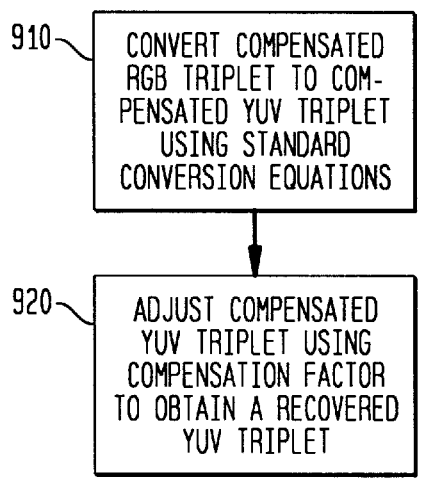
FIG. 9 illustrates the method steps, according to the present invention, performed while converting a color from an RGB color space back to YUV color space.

FIG. 7 is a block diagram of a translator 700, according to the present invention, useful for performing the conversion of a color from RGB color space 230 back to YUV color space 210. For, the case where the color from RGB color space 230 is a result of a conversion as described above, translator 700 includes an reverse color space converter 710 and a compensation readjustor 720. Translator 700 receives as input compensated RGB triplet 370 and compensation factor 360. Translator 700 outputs a recovered YUV triplet 740. FIG. 9. illustrates the method steps performed while converting a color from RGB color space 230 to YUV color space 210. The operation of translator 700 is now described with reference to FIG. 7 and FIG. 9.

In a step 910, reverse color space converter 710 determines a compensated YUV triplet 730 from compensated RGB triplet 370 using conversion equations for converting RGB color space 230 to YUV color space 210. These conversion equations can be obtained from Eq. 1 and are provided below.

$$Y'=Cr*R'+Cg*G'+Cb*B', \quad \text{(Eq. 7A)}$$

$$U'=B'/2-R'*(Cr/(2*(Cr+Cg)))-G'*(Cg/(2*(Cr+Cg))), \quad \text{(Eq. 7B)}$$

and $$V'=R'/2-B'*(Cb/(2*(Cb+Cg)))-G'*(Cg/(2*(Cb+Cg))), \quad \text{(Eq. 7C)}$$

where (Y',U',V') is compensated YUV triplet 730, and (R',G',B') is compensated RGB triplet 370.

In a step 920, compensation readjustor 720 uses compensation factor 360 and compensated YUV triplet 730 to determine a recovered YUV triplet 740. Compensation readjustor 720 determines recovered YUV triplet according to the following equations:

$$Y=1/k*(Y'-0.5), \quad \text{(Eq. 8A)}$$

$$U=1/k*U', \quad \text{(Eq. 8B)}$$

and $$V=1/k*V'. \quad \text{(Eq. 8C)}$$

Figure 8:
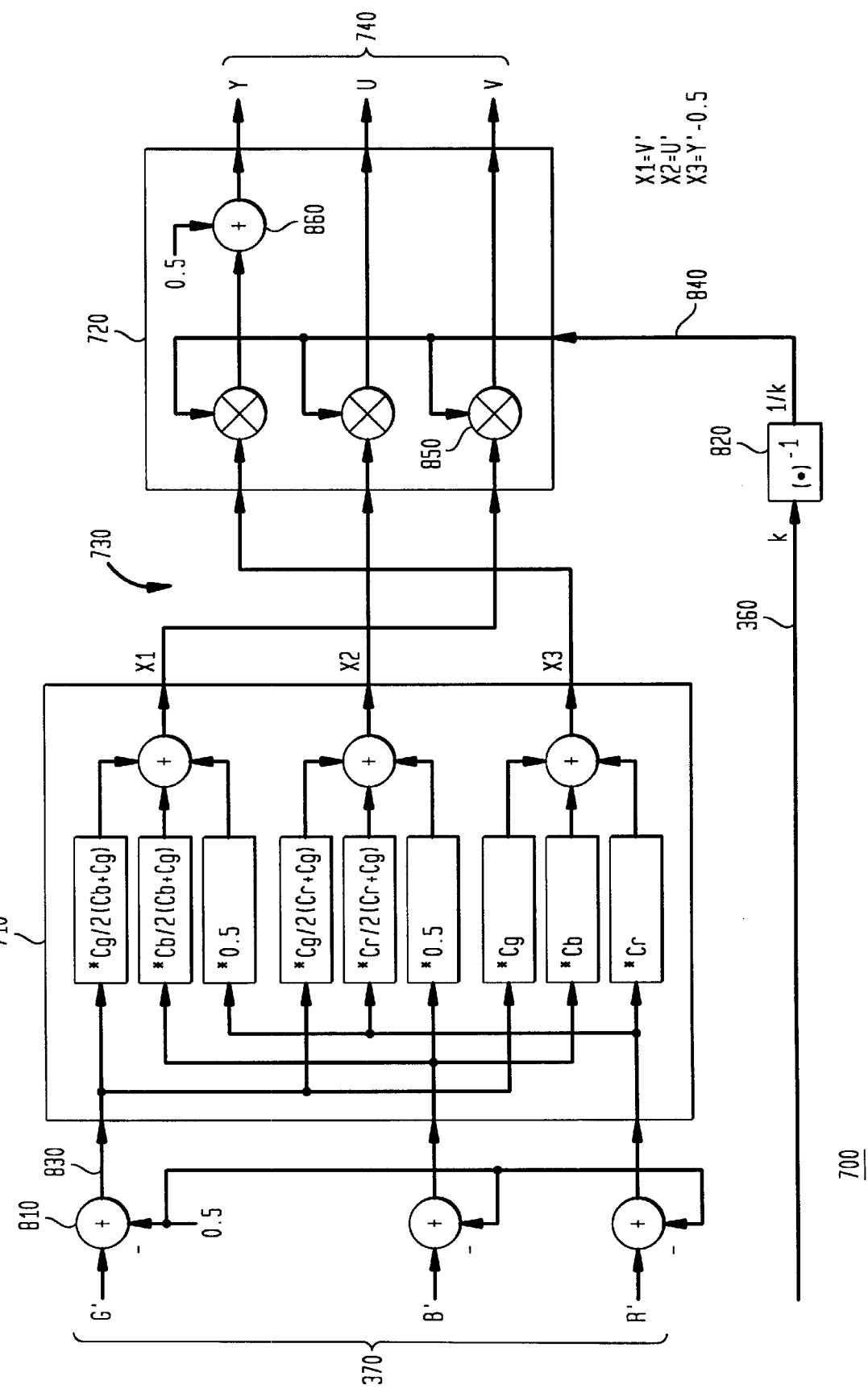
FIG. 8 is a block diagram illustrating a preferred embodiment of a translator useful for performing the conversion from an RGB color space back to YUV color space according to the present invention.

FIG. 8 is a block diagram illustrating a preferred embodiment of translator 700 according to the present invention. Specifically, FIG. 8 illustrates the operations performed by translator 700 in greater detail. These operations can be implemented in a variety of ways. As will be apparent to one skilled in the art, these operations may be implemented in hardware, such as with adders and multipliers, etc., or in hardware lookup tables (LUT). Alternatively, these operations may be performed in software, firmware, microcode, etc., running on a computer. The present invention applies equally well to both implementations as well as various hybrid implementations using both hardware and software.

A preferred embodiment of translator 700 includes a summer bank 810 and an inverting block 820 in addition to reverse color space converter 710 and compensation readjustor 720. Summer bank 810 shifts compensated RGB triplet 370 by −0.5 to shift the valid component range from the range 0 to 1 to the range −0.5 to 0.5 as discussed above. Summer bank 810 outputs a shifted compensated RGB triplet 830.

Reverse color space converter 710 includes the operations required to implement Eq. 7 to thereby determine compensated YUV triplet 730 from compensated RGB triplet 370. Reverse color space converter receives shifted compensated RGB triplet 830 and outputs compensated YUV triplet.

Inverting block 820 receives compensation factor 360 and outputs an inverse compensation factor 840. Inverting block 820 implements an inverse operator as shown. Compensation readjustor 720 receives compensated YUV triplet 730 and inverse compensation factor 840 and outputs recovered YUV triplet 740. Compensation readjustor 720 includes a multiplier bank 850 and a summer 860.

Multiplier bank 850 multiplies each component of compensated YUV triplet 730 by inverse compensation factor 840. Summer 860 shifts the Y component of this result by 0.5 to obtain recovered YUV triplet 740. Compensation readjustor 720 recovers the original YUV triplet 340 as recovered YUV triplet 740. For all practical purposes, YUV triplet 740 is equivalent to YUV triplet 340 and will differ only slightly due to errors, such as rounding, in arithmetic operations performed. This difference will obviously depend on implementation, i.e., number of bits used, fixed point versus floating point operations, etc.

The net effect of translator 700 is to remove the blending with pure grey performed during the conversion from YUV color space 210 to RGB color space 230. This is only accomplished by the preservation of compensation factor 360. Various methods of preserving compensation factor 360 could be implemented including storing color triplets as color quadruplets. One method that uses existing resources in computer equipment optionally preserves compensation factor 360 on an unused alpha channel found in conventional computer equipment. This method is described in the following section.

Using Alpha Channel for Storing Compensation Factor

In the present invention, compensation factor 360 is stored with compensated RGB triplet 370 to represent the color of the pixel being converted from YUV color space 210 to RGB color space 230. Storing compensation factor 360 with compensated RGB triplet 370 allows a YUV triplet to be subsequently recovered.

Figure 10:
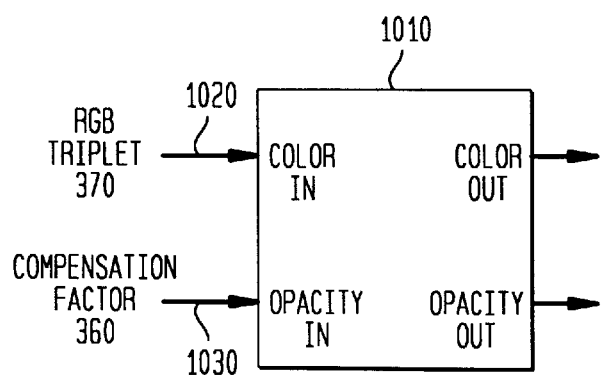
FIG. 10 illustrates a computer equipment having inputs for an RGB triplet and for an alpha channel.

In one embodiment of the present invention, as shown in FIG. 10, compensation factor 360 is placed in an alpha channel 1030. An alpha channel is a specific area of memory found in many graphic subsystems. For example, for a system that uses 10 bits to describe each of the color components, red, blue and green, a 40 bit data path is generally used. In such systems, a frame buffer is provided that comprises 40 bits of storage for each pixel represented on the output device. In this example, 30 bits are used to define a color for each pixel. That is, 10 bits of storage are used for each of the color components, red, blue, and green. The remaining 10 bits are used for the alpha channel.

Computer systems generally use the alpha channel to represent the opacity for each pixel. In computer equipment, opacity is an effect where the background is visible through an object in the foreground. However, for video applications, information related to opacity is not always needed. Thus, in many instances, the alpha channel remains unused. Accordingly, by using the alpha channel to store the compensation factor 360, an embodiment of the present invention is implemented without additional and costly storage devices used for storing the compensation factor 360.

Thus, when YUV color space 210 has no need to provide information regarding opacity on alpha channel 1030, alpha channel 1030 is available to store color information, i.e., the compensation factor 360, otherwise lost during conversion.
A Preferred Implementation for Storing Compensation Factor Using the alpha channel for storing the compensation factor as described above, is useful for systems that do not use the alpha channel for its intended purpose, namely for storing opacity information. However, when the alpha channel is used for whatever reason, another means to store the compensation 360 factor must be provided. A means for storing the compensation factor 360 that does not require additional and costly storage devices is preferred and is provided by the present invention.

An apparatus and method that can be used in a preferred embodiment to store the compensation factor 360 without using additional and costly storage devices and without using the alpha channel will now be described.

Storage space that is ordinarily used to store the color components of the compensated RGB triplet is instead used to store the compensation factor 360 according to a preferred embodiment of the present invention. Specifically, storage space ordinarily used to store one of the color components comprising a compensated RGB triplet is used to store the compensation factor 360. This can be accomplished without losing color information, as will be described below.

For example, in an example embodiment that uses 40 bits to represent each pixel, 10 bits are used to represent a value for each compensated color component (i.e. red, green and blue) and the remaining 10 bits are used for the alpha channel. The present invention uses the 10 bits ordinarily used to store one of the compensated color component for storing the compensation factor 360.

This is accomplished without losing color information because the constant hue algorithm, as described above, yields a compensated RGB triplet in which one of the color components is either zero or fully saturated. This phenomenon is described in detail below with references to FIGS. 12A and 12B. Thus, because only 1 bit is required to describe the state of a color component that is either zero or fully saturated, the other 9 bits can be used to store the compensation factor 320.

As will be described below, in order to implement this preferred coding technique, additional information is generally needed to describe each represented pixel. Specifically, additional information is maintained which defines: (1) whether or not a particular RGB triplet is a compensated RGB triplet (i.e. one that was previously an invalid triplet in the RGB space 230); and (2) which of the three color components in the compensated RGB triplet is used to store the compensation factor 360. Preferred methods for coding this additional information within each RGB triplet with little loss of color information are subsequently described below with reference to FIGS. 13–16.

As stated, a result of the constant hue algorithm yields one compensated RGB triplet value that is either zero or fully saturated. This phenomenon is described in the examples below with reference to FIGS. 12A and 12B.

It should be recalled that the compensation determinator 320, according to a preferred embodiment of the present invention, includes function block 510 comprising the following equation, which is repeated below, for convenience:

$$f_{510}(R,G,B) = \max(|R-0.5|, |G-0.5|, |B-0.5|, 0.5) \quad \text{(Eq. 2, repeated)}$$

Similarly, the compensation factor k 1203, is preferably determined by the following equation which is also repeated for convenience:

$$k = f_{520}(x) = 0.5 * x^{-1} \quad \text{(Eq. 3, repeated)}$$

where x is result 570 of Equation 2.

In addition, as shown by function block 330 in FIG. 5, compensated RGB triplet 370 (R'G'B') can be expressed as follows:

R'=(R−0.5)*k+0.5

G'=(G−0.5)*k+0.5

B'=(B−0.5)*k+0.5

The following two examples are presented to demonstrate that using the constant hue algorithm yields a compensated RGB triplet in which one of the color components is either zero or fully saturated. In these examples, it is assumed that a valid range for each component of the RGB triplet is 0 to 1.

Figure 12A:
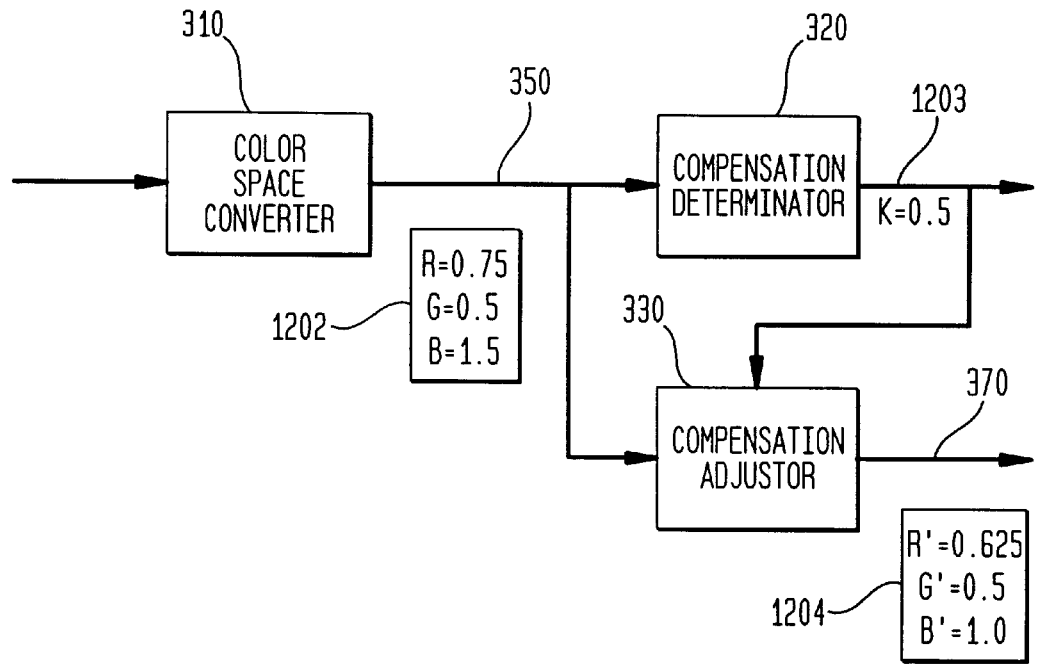
FIGS. 12A and 12B are block diagrams, each similar to FIG. 3, depicting a preferred translator according to the present invention.
Figure 12B:
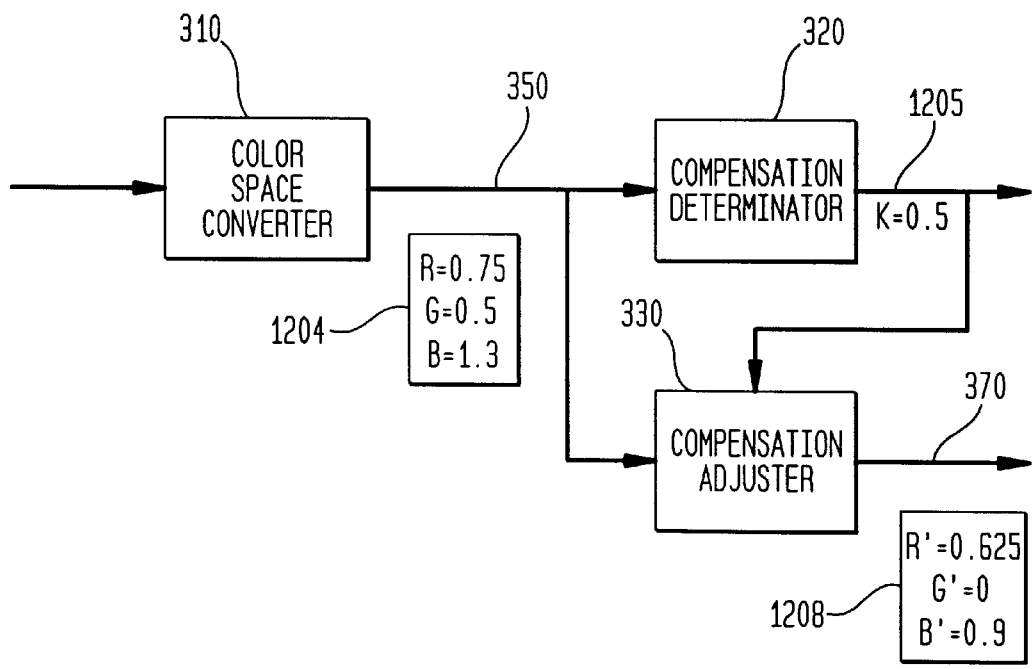

FIGS. 12A and 12B are block diagrams, each similar to FIG. 3, depicting a preferred translator 300 useful for performing the conversion of a color from YUV color space 210 to RGB color space 230. Translator 300 includes a color space converter 310, a compensation determinator 320, and a compensation adjustor 330. Translator 300 outputs a compensated RGB triplet (shown as comp. RGB triplet 1204 in FIG. 12A and as comp. RGB triplet 1208 in FIG. 12B). Translator 300 also outputs a compensation factor k, as depicted by 1203 and 1205 in FIGS. 12A and 12B, respectively.

In the first example depicted in FIG. 12A, an uncompensated RGB triplet 1202 is:

R=0.75, G=0.5 and B=1.5.

In this example, the B component of RGB triplet 1202 is beyond the valid range of 0–1 in RGB space 230.

Accordingly, applying Eq. 2 to the invalid RGB triplet 1202 yields:

$$f_{510}(R, G, B) = \max(|R - 0.5|, |G - 0.5|, |B - 0.5|, 0.5)$$
$$= \max(|0.25|, |0|, |1|, 0.5)$$
$$= \max(0.25, 0, 1, 0.5)$$
$$= 1.$$

Next, applying Equation 3 to the result 570, yields the compensation factor k 1203 as:

$$k = 0.5 * x^{-1}$$
$$= 0.5 * (1/1)$$
$$= 0.5$$

Thus, using the constant hue algorithm in compensation adjustor 330, the compensated triplet 1204 becomes:

R'=(0.75−0.5)*0.5+0.5=0.625

G'=(0.5−0.5)*0.5+0.5=0.5

B'=(1.5−0.5)*0.5+0.5=1.0

In this example, the blue component of compensated RGB triplet 1204, namely B', is fully saturated. In other words, B' is at the maximum of the valid range (i.e. B'=1). It should be noted that the saturated component of the compensated RGB triplet corresponds to the component that was beyond the valid range for the uncompensated RGB triplet 1202. In fact, this will always be the case. That is, when only one component of the uncompensated RGB triplet comprises an invalid value, that component becomes the component in the compensated RGB triplet that is either zero or saturated.

Furthermore, if more than one component is invalid in the uncompensated RGB triplet, the component that is the most out-of-range, (either above 1 or below 0 in this example), will be the component in the compensated RGB triplet that is either zero or saturated.

Whether the invalid component is below or above the valid range determines whether the corresponding compensated component is zero or saturated. Specifically, if the most out-of-range component (or the single out-of-range component) is below the valid range in RGB space 230, the corresponding component in the compensated RGB triplet is zero. If the most out-of-range component (or the single out-of-range component) is above the valid range in RGB space 230, the corresponding component in the compensated RGB triplet is saturated.

Accordingly, in the first example presented in FIG. 12A, one component (blue) is out-of-range and is above the valid range (B=1.5) in RGB space 230. As a result of the compensation adjustor 330, the blue component in the compensated RGB triplet becomes saturated (B'=1).

In a second example presented in FIG. 12B, two components (namely green and blue) are out-of-range. In addition, the most out-of-range component (green, in this example) is below the valid range of RGB space 230. Thus, it is expected that the green component of compensated RGB triplet 1208 becomes zero.

In this second example the uncompensated RGB triplet 1204 is:

R=0.75, G=−0.5 and B=1.3.

Applying Equation 2 yields, $$f_{510}(R, G, B) = \max(|R - 0.5|, |G - 0.5|, |B - 0.5|, 0.5)$$
$$= \max(|0.25|, |-1|, |0.8|, 0.5)$$
$$= \max(0.25, 1, 0.8, 0.5)$$
$$= 1.$$

Next, a compensation factor 1205 is determined using Equation 3:

$$k = 0.5 * x^{-1}$$
$$= 0.5 * (1/1)$$
$$= 0.5$$

Thus, using the constant hue algorithm for invalid triplet 1204, compensated RGB triplet 1208 becomes:

R'=(0.75−0.5)*0.5+0.5=0.625

G'=(−0.5−0.5)*0.5+0.5=−1*0.5+0.5=0

B'=(1.3−0.5)*0.5+0.5=0.9

Accordingly, the green component of compensated RGB triplet 1208 is zero as a result of the constant hue algorithm. In this example, the green component of uncompensated RGB triplet 1204 is the most out-of-range of the two components that are out-of-range. Specifically, the green component is 0.5 below the valid range of RGB space 230, and the blue component is 0.3 above the valid range. Thus, as expected, the compensated green component of RGB triplet 1208 is zero.

As stated, in order to implement the preferred coding technique and store the compensation factor in the compensated RGB triplet, additional information is required to describe each represented pixel. The first type of required information is related to whether a particular RGB triplet is a compensated RGB triplet (i.e. one that was previously an invalid triplet in the RGB space 230). The second type of required information identifies which one of the three components in the compensated RGB triplet is used to store the compensation factor 320.

A preferred method for coding the compensation factor and such additional information within each RGB triplet will now be described with reference to FIGS. 13, 14A and 14B.

FIG. 13 is a table depicting a preferred coding technique for describing pixels having valid colors (i.e. RGB triplets that have not been compensated according to the present invention). For valid triplets, a compensation factor 360 is not needed because these colors can be readily translated back to YUV triplets. Accordingly, a compensation factor 360 is not stored in such valid triplets.

However, the present invention provides a means for distinguishing valid uncompensated triplets from compensated triplets. This is necessary because valid uncompensated triplets are handled differently than compensated triplets due to the different way information is stored therein.

Thus, according to a preferred embodiment of the present invention, compensated triplets are distinguished from valid uncompensated triplets by the least significant bit (LSB) of each component in RGB triplets. Specifically, in the examples used herein, compensated triplets are identified by enforcing an even, "non-zero" parity across the three LSBs The terms "zero parity" and "non-zero parity" are defined herein as follows. A zero parity exists when the LSB of all components of an RGB triplet is equal to zero. A non-zero parity exists when the LSB of at least one component of an RGB triplet is equal to one.

Valid triplets that happen to have even, non-zero parities across their LSBs are adjusted so that an odd parity is created and maintained. Note that this is just one example of a preferred coding technique that can be used with the present invention. It is not intended that the present invention be limited by the examples presented herein. In fact, after reading this disclosure, many other coding techniques that are similar in form and spirit to the coding techniques presented herein will be readily apparent to persons skilled in the relevant art(s).

As stated, valid uncompensated RGB triplets that happen to have even, non-zero parities across their LSBs are adjusted so that an odd parity is created. In this example, the LSB of one component is inverted to enforce an odd parity. This will of course, change the value of the component that is altered. However, because only the LSB of the color is affected, the change in the color is negligible.

In a preferred embodiment, the LSB of the blue component is inverted to produce an odd parity across the component's LSBs as shown in FIG. 13. The blue component is selected in a preferred embodiment because it has the least effect on luminance.

In FIG. 13, the LSBs of each component as originally coded according to the proper color codes, of uncompensated RGB triplets are depicted in column 1302. All possible combinations of the LSBs of uncompensated RGB triplets are depicted in column 1302. Column 1304 lists the parity across the three LSBs for the combinations in column 1302 in the order of red, green and blue. Column 1306 depicts a final coding for the LSBs, which may be adjusted from the original coding according to a preferred embodiment of the present invention. Specifically, only triplets that have an even parity are adjusted. Column 1308 contains a description of the difference between the original LSB coding and the final LSB coding for each triplet. That is, column 1308 describes the difference if any, between columns 1302 and 1306.

Row 1310 represents RGB triplets having an original coding of '0,0,0' for the LSBs of the red, green and blue components, respectively. As shown in column 1304, this is an example of an even, but zero parity (referred to as even-zero parity). Because even-zero parity is used to represent valid uncompensated RGB triplets, no change is made to valid RGB triplets having these values in their LSBs, as indicated by columns 1306 and 1308.

Similarly, row 1312 represents RGB triplets having an original LSB coding of '0,0,1'. This is an example of a valid triplet having an odd parity as indicated in column 1304. Therefore, because odd parity is used in this example to represent valid uncompensated RGB triplets, no coding change is made to their LSBs, as indicated by columns 1306 and 1308.

In a similar fashion, no changes are made to the triplets that already have an odd parity across their LSBs as shown by the rows 1314, 1318, and 1324. However, non-compensated RGB triplets having non-zero-even parities across their LSBs are modified so that odd parity is created. As shown below, this is accomplished by inverting the blue RGB component.

For example, row 1316 represents RGB triplets having an original coding of '0,1,1'. This is an example of a valid uncompensated RGB triplet that happens to have an even parity, as indicated in column 1304. Accordingly, the LSB of the blue component is inverted (i.e. changed from a '1' to a '0'), as indicated by column 1306. Triplets re-coded in this fashion now contain an odd parity across their LSBs, which properly identifies them as an valid uncompensated triplet.

In a similar fashion, other even parity uncompensated RGB triplets as represented by rows 1320 and 1322 are re-coded so that odd parities are created. Specifically, uncompensated triplets having an original coding of '1,0,1' (row 1320, column 1302) are re-coded to '1,0,0' as indicated by column 1306. Similarly, uncompensated triplets having an original coding of '1,1,0' (row 1322, column 1302) are re-coded to '1,1,1' as indicated by column 1306.

In this fashion, valid uncompensated RGB triplets are distinguished from compensated RGB triplets by simply examining the parity of the LSBs. It should be noted that by using the above technique, only one LSB of information is lost for those triplets that are modified (i.e. rows 1316,1320 and 1322) in order to enforce the odd parity for valid uncompensated RGB triplets. More specifically, a small error having a magnitude of only one LSB is deliberately induced for triplets that are modified to enforce the odd parity using the above technique.

Coding for compensated RGB triplets will now be described with reference to FIGS. 14A and 14B. It should now be apparent that all compensated RGB triplets are specifically coded, according to a preferred embodiment of the present invention, so that even, non-zero parities are enforced across their LSBs. In FIG. 14A, a table is presented that depicts an example of a preferred coding technique that can be used to implement the present invention. As stated, it is not intended that the present invention be limited by the examples presented herein. In fact, after reading this disclosure, many other coding techniques that are similar in form and spirit to the coding techniques presented herein will be readily apparent to persons skilled in the relevant art(s).

In table 14A, column 1402 represents re-coded LSBs for compensated RGB triplets. Column 1404 lists the parity, which as stated is always even, non-zero in this example. Column 1408 describes the result of the re-coding from column 1402.

As stated, all compensated RGB triplets are re-coded so that even, non-zero parities are enforced. Thus, the LSB of two components are always '1' and the LSB of a third component is '0'. In a preferred embodiment, the LSBs of compensated RGB triplets are specifically coded so that the component comprising a '0' in its LSB, is the one that is used to store the compensation factor 360.

Accordingly, as depicted in row 1410, compensated RGB triplets that are coded with '0,1,1' in their LSB positions, indicate that the red component contains the compensation factor. As depicted by row 1412, compensated RGB triplets that are coded with '1,0,1' in their LSB positions, indicate that the green component contains the compensation factor. As depicted by row 1414, compensated RGB triplets that are coded with '1,1,0' in their LSB positions indicate that the blue component contains the compensation factor. In this fashion, the component that is used to store the compensation factor in compensated RGB triplets can readily be determined using hardware or software techniques.

FIG. 14B is a table depicting a coding technique for the compensation factor according to a preferred embodiment of the present invention. In this example, 10 bits are used to store values for each component in RGB triplets. Accordingly, an 8 bit compensation factor is stored in the 8 bits beginning with the most significant bit (MSB) 1416. In this example, the bit position below the compensation factor is used to indicate whether the particular color in the compensated triplet is zero or saturated, as previously described. Finally, as shown by column 1420, the LSB of the color component that is used to store the compensation factor 1416 is always 0.

Figure 15:
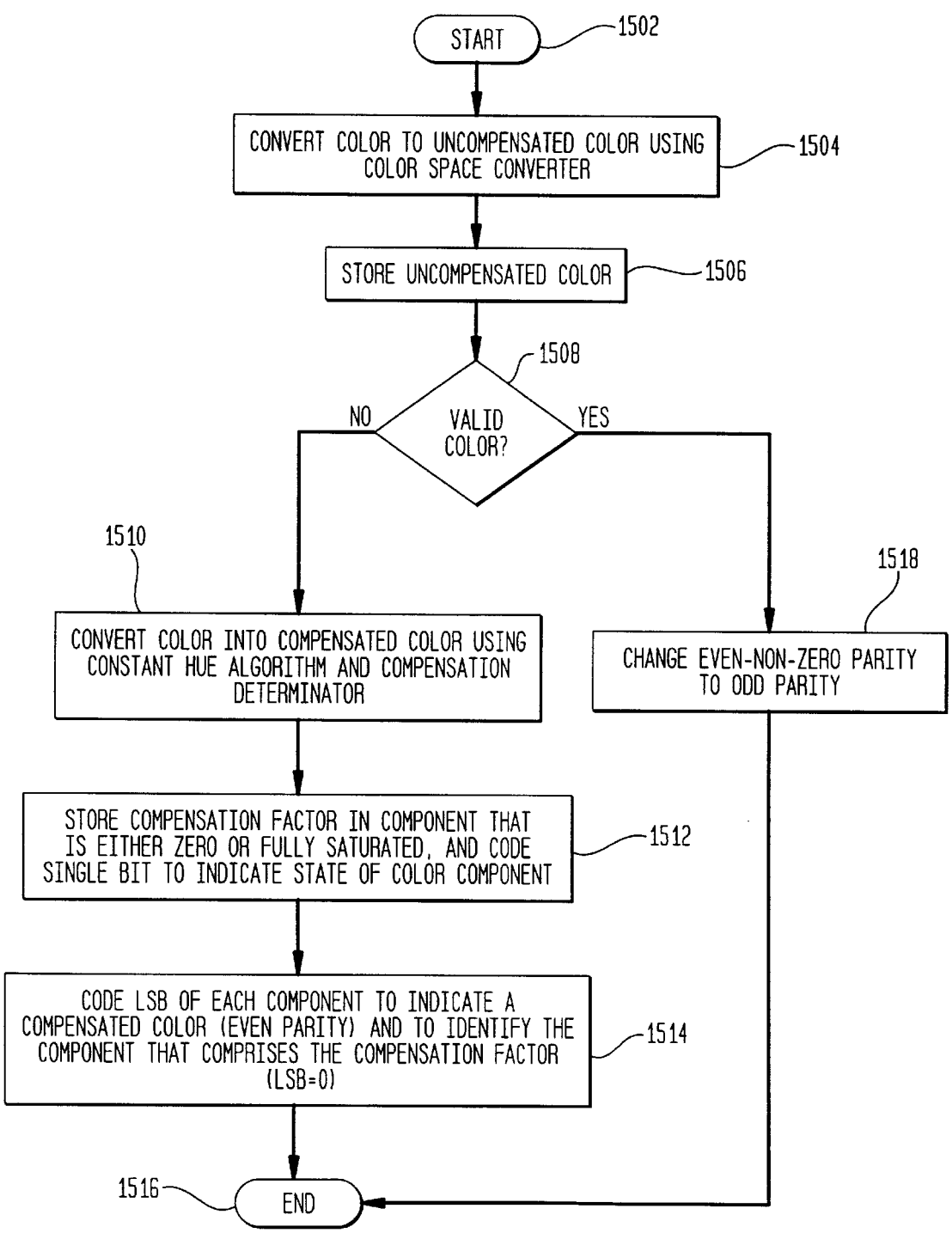
FIG. 15 is a flowchart depicting a method that can be used to code and store a converted color according to the present invention.

A method that can be used to code and store a converted color according to a preferred embodiment of the present invention will now be described with reference to FIG. 15. The method begins with step 1502 where control immediately passes to a step 1504. In step 1504, a color in a first color space is converted to an uncompensated color is a second color space using a color space converter 310. Control then passes to step, 1506, where the uncompensated color is stored.

Next, in a step 1508, the method determines whether the uncompensated color is valid in the second color space. This is accomplished by comparing each color component of the uncompensated color against a valid range associated with the second color space. If any of the components are above or below the valid range, the color is invalid, and control passes to a step 1510. If all of the components are within the valid range, then the color is valid and control passes to a step 1518.

In step 1518 the valid, uncompensated color is coded (or a code is maintained therein) to indicate a valid color. In a preferred embodiment, as shown by the examples used above, this is accomplished by assuring the LSBs of the components comprise either an even-zero parity of an odd parity. If the uncompensated color is either even-zero or odd parity, no change is made to the triplet (see FIG. 13). If on the other hand, the LSBs of the uncompensated color have an even, non-zero parity, one bit is inverted so that an odd parity is enforced. In a preferred embodiment, the LSB of the blue component is inverted because it has the least effect on luminance. Next the process ends, as indicated by a step 1516.

Step 1508 indicates an invalid color, control passes to a step 1510. In step 1510, the color is converted into a compensated color using a compensation determinator 320 and a compensation adjustor 330. Compensation determinator 320 determines a compensation factor 360. In a step 1512, the compensation factor is stored within the component of the compensated triplet that is either zero of fully saturated. In addition, one bit of the zero or saturated component is adjusted to indicate whether the component is zero of saturated. Control then passes to a step 1514.

In step 1514, the compensated triplet is coded so that the LSB of the color component that contains the compensation factor 360 is zero, and the LSB of the other components contain a value of 1. The process then ends as indicated by a step 1516.

Note that by using the above method, a small error in color information is deliberately induced. However, as stated, this error is generally negligible. Specifically, for uncompensated triplets, a error of one LSB of information (i.e. the LSB of the blue component) is potentially induced. For compensated triplets, a error having a magnitude of one LSB in one or two color components of an RGB triplet is potentially induced.

A Second Preferred Implementation for Storing Compensation Factor

Accordingly, another technique that can be used which does not incur such color losses will now be described. This technique makes use of two bits in the alpha channel and allows for the remaining bits to be used for storing opacity information (or other information as needed). Accordingly, this technique is preferably used in systems that employ a sufficiently wide data path so that two bits of the alpha channel can be used for other purposes without incurring a significant loss of opacity or other information.

For example, a system that employs a 48 bit data path uses 12 bits for each of the three color components and the remaining 12 bits are used for the alpha channel. Thus, if 2 bits in the alpha channel are used to store compensation information, as described below, 10 bits remain for storing opacity or other information. For many applications a 10 bit alpha channel is sufficient.

Figure 16A:
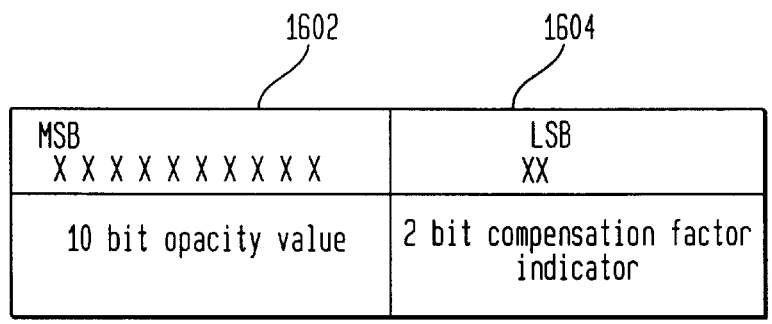
FIGS. 16A and 16B are tables depicting an example of a coding technique using the alpha channel according to the present invention.

Accordingly, referring now to FIG. 16A, as shown by column 1602, the 10 MSBs of the alpha channel are used to store opacity or other information as required. As column 1604 indicates, the two LSBs are used to store a 2 bit compensation factor indicator. Note that in other implementations this can be reversed. That is, the 2 MSBs are used to store the compensation factor indicator, and the 10 LSBs are used to store the alpha channel information. Other combinations are also possible, and it is not intended that this example limit the scope and breadth of the present invention. For example, more than 2 bits can be used for the compensation factor indicator in cases where more than three components are used to describe colors. Other techniques that can be used with the present invention would be apparent to persons skilled in the relevant art(s).

Figure 16B:
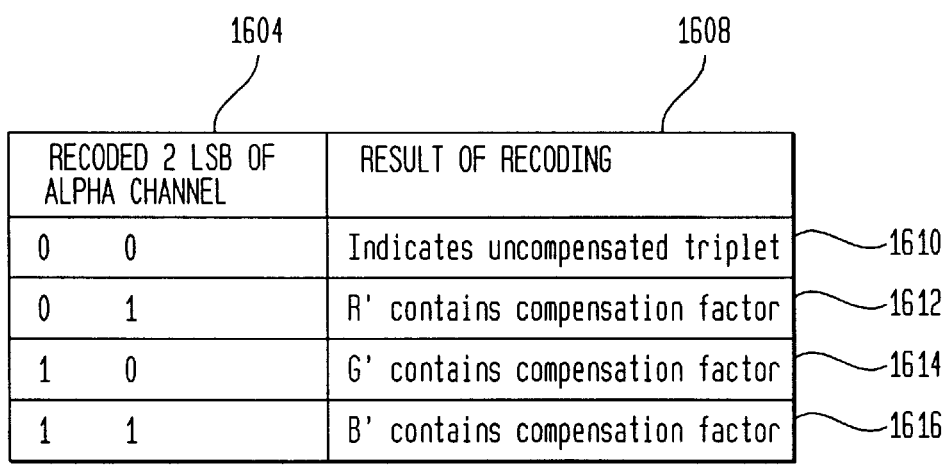

In FIG. 16B, an example of a coding that can be used for the 2 bit compensation factor indicator 1604 are depicted. Column 1604 depicts all possible combinations for the 2 bit compensation factor indicator and column 1608 describes the result of the coding in this example. Accordingly, as shown by row 1610, a value of '0,0' indicates that the associated triplet is an uncompensated triplet. As such a compensation factor is not stored within the triplet, as it contains three valid color components.

As depicted by row 1612, a value of '0,1' indicates that the red component is being used to store the compensation factor. As row 1614 indicates, a value of '1,0' identifies the green component as the one that contains the compensation factor. Similarly, as shown by row 1616, a value of '1,1' indicates that the blue component includes the compensation factor.

Figure 16C:
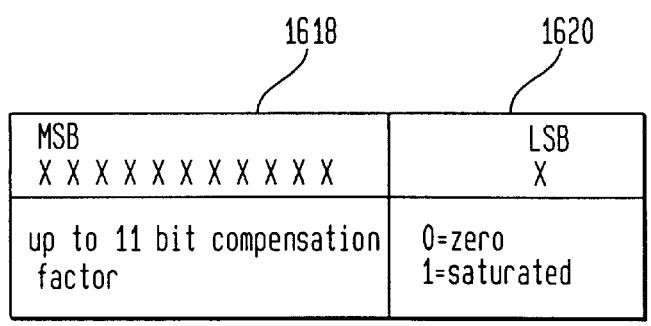
FIG. 16C is a table depicting a coding technique for the compensation factor, when the alpha channel is used in conjunction therewith.

FIG. 16C is a table depicting a coding technique that can be used to store the compensation factor, when two bits in the alpha channel are used to store the compensation factor indicator, as described above. In this example, 12 bits are used to store values for each component in RGB triplets. Accordingly, up to 11 bits can be used to store the compensation factor, and the remaining bit is used to indicate whether the component is either zero or fully saturated.

Specifically, in this example, an 11 bit compensation factor is stored in the 11 bits beginning with the most significant bit (MSB) 1618. In addition, as indicated by column 1620, the LSB of the color component is used to indicate whether the particular color in the compensated triplet is zero or saturated.

Note that by using this method, no color information is lost for either uncompensated or compensated colors. Thus, this technique may be preferred over the previous technique for systems having a sufficiently large data path so that two bits of the alpha channel can be spared. Likewise, the first technique disclosed herein may be preferred for systems that need to use the entire alpha for opacity information or the like. The choice of which technique to use depends on the needs and requirements of each specific implementation of the present invention.

Preferred Implementation of Translator

Figure 11:
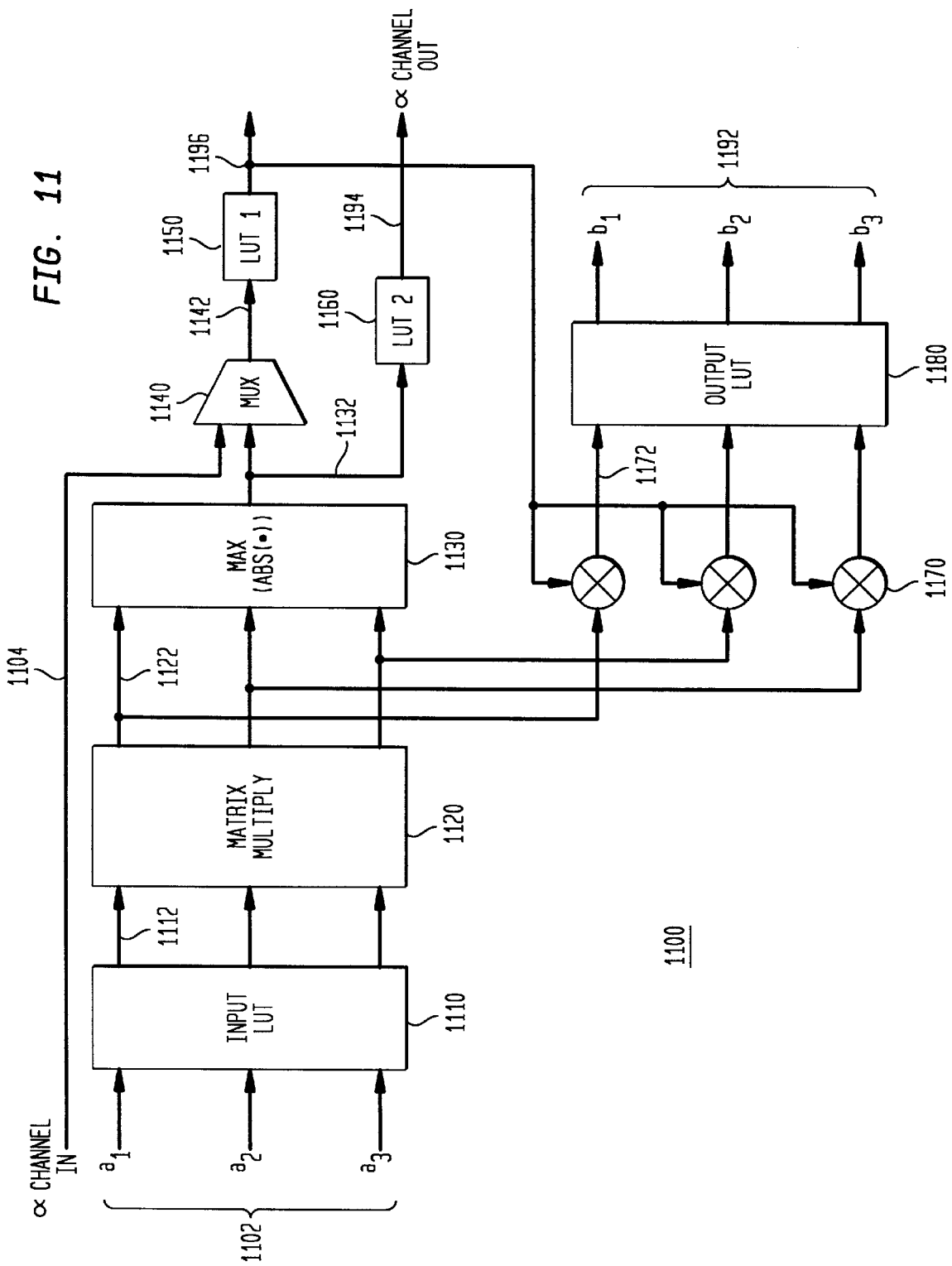
FIG. 11 is a block diagram of a preferred embodiment of a translator for performing both the conversion from a YUV color space to an RGB color space and the conversion from the RGB color space back to the YUV color space according to the present invention.

FIG. 11 illustrates a preferred implementation of a translator 1100 useful for implementing both translator 300 and translator 700. Translator 1100 includes an input lookup table (input LUT) 1110, a matrix multiplier 1120, a function block 1130, a multiplexer (mux) 1140, a first lookup table (first LUT) 1150, a second lookup table (second LUT) 1160, a multiplier bank 1170, and an output lookup table (output LUT) 1180. Translator 1100 receives an input triplet 1102 and alpha channel input 1104. Translator outputs an output triplet 1192 and alpha channel output 1194. Translator 1100 is implemented to operate in one of two modes: a YUV-to-RGB mode, for converting from YUV color space 210 to RGB color space 230, and a RGB-to-YUV mode, for converting from RGB color space 230 to YUV color space 210. The following description will discuss the operation of the elements of translator 1100 according to which mode is being used.

Input LUT 1110 receives input triplet 1102 and outputs a triplet 1112 based on whether translator 1100 is operating in YUV-to-RGB mode or RGB-to-YUV mode. If translator 1100 is operating in YUV-to-RGB mode, input LUT 1110 is loaded with information to perform the operation of summer 620 shown in FIG. 6. In this mode, input LUT 1110 receives YUV triplet 340 and outputs a YUV triplet 1112 with the Y component shifted by −0.5 according to the following equations:

$$Y_{out}=Y_{in}-0.5, \quad \text{(Eq. 9A)}$$

$$U_{out}=U_{in}, \quad \text{(Eq. 9B)}$$

and $$V_{out}=V_{in}, \quad \text{(Eq. 9C)}$$

where $(Y_{in},U_{in},V_{in})$ is an input to input LUT 1110, and $(Y_{out},U_{out},V_{out})$ is an output of input LUT 1110.

If translator is operating in RGB-to-YUV mode, input LUT 1110 is loaded with information to perform the operation of summer bank 810 shown in FIG. 8. In this mode, input LUT 1110 receives compensated RGB triplet 370 and outputs an RGB triplet 1112 with each component shifted by −0.5 according to the following equations:

$$R_{out}=R_{in}-0.5, \quad \text{(Eq. 10A)}$$

$$G_{out}=G_{in}-0.5, \quad \text{(Eq. 10B)}$$

and $$B_{out}=B_{in}-0.5, \quad \text{(Eq. 10C)}$$

where $(R_{in},G_{in},B_{in})$ is an input to input LUT 1110, and $(R_{out},G_{out},B_{out})$ is an output of input LUT 1110.

Matrix multiplier 1120 receives triplet 1112 from input LUT 1110 and outputs triplet 1122. Matrix multiplier 1120 is functionally capable of performing a 3 by 3 matrix multiplication using coefficients supplied or downloaded to it. If translator 1100 is operating in YUV-to-RGB mode, matrix multiplier 1120 is loaded with coefficients to implement Eq. 1. In this mode, matrix multiplier receives YUV triplet 1112 and outputs triplet 1122 which corresponds to uncompensated RGB triplet 850. If translator 1100 is operating in RGB-to-YUV mode, matrix multiplier 1120 is loaded with coefficients to implement Eq. 7. In this mode, matrix multiplier receives RGB triplet 1112 and outputs triplet 1122 which corresponds to compensated YUV triplet 730.

Function block 1130 receives triplet 1122 and outputs a result 1132 dependent on the maximum of the absolute value of the components of triplet 1122. Function block implements Eq. 6. The operation of function block 1130 is identical to function block 610 above.

Mux 1140 receives alpha channel input 1104 as an input to translator 1100 and result 1132 from function block 1130. Mux 1140 outputs a result 1142 depending on the mode in which translator 1100 is operating. If translator 1100 is operating in YUV-to-RGB mode, mux 1140 selects result 1132 from function block 1130 as result 1142. If translator 1100 is operating in RGB-to-YUV mode, mux 1140 selects alpha channel input 1104 as result 1142. Mux 1140 outputs result 1142 to first LUT 1150.

First LUT 1150 receives result 1142 from mux 1140 and outputs a result 1196 to multiplier bank 1170 based on the mode in which translator 1100 is operating. If translator 1100 is operating in YUV-to-RGB mode, first LUT 1150 is loaded with information to perform the operation of function block 520 shown in FIG. 6. In this mode, first LUT 1150 receives result 1142 from mux 1140 and outputs result 1196 which corresponds to compensation factor 360. If translator 1100 is operating in RGB-to-YUV mode, first LUT 1150 is loaded with information to perform the following operation:

$$X_{out}=2^*X_{in}. \quad \text{(Eq. 11)}$$

In this mode, first LUT 1150 receives alpha channel 1104 from mux 1140 and outputs result 1196 which corresponds to the inverse compensation factor 840.

Multiplier bank 1170 receives result 1196 from first LUT 1150 and triplet 1122 from matrix multiplier 1120, and outputs a triplet 1172 to output LUT 1180. Multiplier bank 1170 multiplies each component of triplet 1122 by result 1196.

Output LUT 1180 receives triplet 1172 from multiplier bank 1170 and outputs triplet 1192 based on the mode in which translator 1100 is operating. If translator 1100 is operating in YUV-to-RGB mode, output LUT 1180 is loaded with information to perform the operation of summer bank 540 shown in FIG. 6. In this mode, output LUT 1180 receives triplet 1172 from multiplier bank 1170 and outputs triplet 1192, which corresponds to compensated RGB triplet 370, according to the following equations:

$$O1_{out}=O1_{in}+0.5, \quad \text{(Eq. 12A)}$$

$$O2_{out}=O2_{in}+0.5, \quad \text{(Eq. 12B)}$$

and $$O3_{out}=O3_{in}+0.5, \quad \text{(Eq. 12C)}$$

where $(O1_{in}, O2_{in}, O3_{in})$ is triplet 1172,
and
$(O1_{out}, O2_{out}, O3_{out})$ is triplet 1192.

If translator 1100 is operating in RGB-to-YUV mode, output LUT 1180 is loaded with information to perform the operation of summer bank 840 shown in FIG. 8.

In this mode, output LUT 1180 receives triplet 1172 from multiplier bank 1170 and outputs triplet 1192, which corresponds to recovered YUV triplet 740, according to the following equations:

$$O1_{out}=O1_{in}+0.5, \quad \text{(Eq. 13A)}$$

$$O2_{out}=O2_{in}, \quad \text{(Eq. 13B)}$$

and $$O3_{out}=O3_{in}, \quad \text{(Eq. 13C)}$$

where $(O1_{in}, O2_{in}, O3_{in})$ is triplet 1172,
and
$(O1_{out}, O2_{out}, O3_{out})$ is triplet 1192.

Second LUT 1160 receives result 1132 from function block 1130 and outputs an alpha channel output 1194. Second LUT 1160 is used in the preferred embodiment only when translator 1100 is operating in YUV-to-RGB mode. Second LUT 1160 outputs information corresponding to compensation factor 360 onto alpha channel 1030. In the preferred embodiment, translator 1100 outputs result 1132 directly as alpha channel output 1194 to alpha channel 1030 rather than compensation factor 360. This is because result 1132 is proportional to inverse compensation factor 840 already. Specifically, in YUV-to-RGB mode, alpha channel output 1194 is determined by:

$$\alpha=1/(2*k) \quad \text{(Eq. 14)}$$

where

α is alpha channel output 1194
and
k is compensation factor 360.

As thus described with respect to YUV color space 210 and RGB color space 230, it will be readily apparent how translator 1100 can be adapted to other color spaces. For example, information supplied or downloaded to input LUT 1110, first LUT 1150, second LUT 1160, output LUT 1180 and matrix multiplier 1120 can be easily modified to accommodate conversions between other color spaces.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for coding colors and storing a compensation factor for a color converted from a first color space to a color in a second color space, each color having a plurality of components, the method comprising the steps of:

converting the color in the first color space to an uncompensated color in the second color space;

determining if said uncompensated color is a valid color in the second color space by comparing said uncompensated color against a predetermined range of valid colors associated with the second color space; and if said uncompensated color is valid, then maintaining a code to identify the color as a valid uncompensated color;

if said uncompensated color is not valid, then transforming said uncompensated color into a compensated color using a compensation factor;

replacing one of the plurality of components of said compensated color with said compensation factor, so that said compensation factor is explicitly stored with said compensated color; and coding said compensated color to identify it as a compensated color.

2. The method of claim 1, wherein said step of maintaining a code to identify the color as a valid uncompensated color comprises the steps of:

finding if a first parity exists across a set of bits associated with said valid uncompensated color, wherein said set of bits comprises a bit, in a predetermined bit position, from each of the plurality of components; and inverting one of said set of bits so that said first parity is maintained, if said first parity is not found according to said finding step.

3. The method of claim 2, wherein said first parity is odd or even-zero parity and said predetermined bit position is the least significant bit.

4. The method of claim 2, wherein said one of said bits is a bit associated with a blue component of an RGB triplet.

5. The method of claim 1, wherein said step of transforming said uncompensated color into a compensated color results in said compensated color in which a most out-of-range component is either zero or saturated, and wherein said replacing step comprises the steps of:

identifying said most-out-of-range component;

replacing a value associated with said most out-of-range component with said compensation factor; and re-coding an additional bit in said most-out-of-range component to identify it as being either zero or saturated.

6. The method of claim 5, wherein said coding step comprises the step of maintaining a particular parity across a set of bits associated with said compensated color, wherein said set of bits comprises a bit, in a predetermined bit position, from each of the components, and wherein said particular parity comprises a value for said most out-of-range component and a different value for the other components, thereby identifying said most out-of-range component.

7. The method of claim 6, wherein said particular parity is even, said predetermined bit position is a least significant bit, and wherein a value of zero is used to identify said most out-of-range component.

8. The method of claim 1, wherein said step of transforming said uncompensated color into a compensated color results in said compensated color in which a most out-ofrange component is either zero or saturated, the plurality of components includes an alpha channel, and said step of enforcing a code to identify the color as a valid uncompensated color comprises the step of:

coding a portion of said alpha channel to indicate that the color is a valid uncompensated color.

9. The method of claim 1, wherein said step of transforming said uncompensated color into a compensated color results in said compensated color in which a most out-of-range component is either zero or saturated, the plurality of components includes an alpha channel, and said step of coding said compensated color to identify it as a compensated color comprises the step of:

coding a portion of the alpha channel to indicate which compensated color component comprises the compensation factor.

10. A system for coding colors and storing a compensation factor for a color converted from a first color space to a color in a second color space, each color comprising a plurality of components, comprising:

means for converting the color in the first color space to an uncompensated color in the second color space;

means for determining if said uncompensated color is a valid color in the second color space by comparing said uncompensated color against a predetermined range of valid colors associated with the second color space; and if said uncompensated color is valid:

means for maintaining a code to identify the color as a valid uncompensated color;

if said uncompensated color is not valid:

means for transforming said uncompensated color into a compensated color using a compensation factor and a compensation adjuster;

means for replacing one of the plurality of components of said compensated color with said compensation factor so that said compensation factor is explicitly stored with said compensated color; and means for coding said compensated color to identify it as a compensated color.

11. The system of claim 10, wherein said means for maintaining a code to identify the color as a valid uncompensated color comprises:

means for finding if a first parity exists across a set of bits associated with said valid uncompensated color, wherein said set of bits comprises a bit, in a predetermined bit position, from each of the plurality of components; and means for inverting one of said set of bits so that said first parity is maintained, if said first parity is not found by said finding means.

12. The system of claim 11, wherein said first parity is odd or even-zero parity and said predetermined bit position is the least significant bit.

13. The system of claim 11, wherein said one of said bits is a bit associated with a blue component of an RGB triplet.

14. The system of claim 10, wherein said compensation adjuster results in a compensated color in which a most out-of-range component is either zero or saturated, and wherein said means for replacing comprises:

means for identifying said most-out-of-range component;

means for replacing a value associated with said most out-of-range component with said compensation factor; and means for re-coding an additional bit in said most-out-of-range component to identify it as being either zero or saturated.

15. The system of claim 14, wherein said means for coding comprises:

means for maintaining a particular parity across a set of bits associated with said compensated color, wherein said set of bits comprises a bit, in a predetermined bit position, from each of the components, and wherein said particular parity comprises a value for said most out-of-range component and a different value for the other components, thereby identifying said most out-of-range component.

16. The system of claim 15, wherein said particular parity is even, said predetermined bit position is a least significant bit, and wherein a value of zero is used to identify said most out-of-range component.

17. The system of claim 10, wherein said compensation adjuster results in a compensated color in which a most out-of-range component is either zero or saturated, the plurality of components includes an alpha channel, and said means for maintaining a code to identify the color as a valid uncompensated color comprises:

means for coding a portion of said alpha channel to indicate that the associated color is a valid uncompensated color.

18. The system of claim 10, wherein said compensation adjuster results in a compensated color in which a most out-of-range component is either zero or saturated, the plurality of components includes an alpha channel, and said means for coding said compensated color to identify it as a compensated color comprises:

means for coding a portion of said alpha channel to indicate which compensated color component comprises the compensation factor.

\* \* \* \* \*

UNITED STATES PATENT AND TRADEMARK OFFICE
CERTIFICATE OF CORRECTION

PATENT NO. : 5,995,655

DATED : November 30, 1999

INVENTORS : Lockett *et al.*

It is certified that an error appears in the above-identified patent and that said Letters Patent is hereby corrected as shown below.

In column 20, lines 8-9 (Equation 10C), delete "$B_{out}=B_{in}0.5$" and insert --$B_{out}=B_{in}-0.5$-- in place therefor.

In column 23, line 37, delete "factor so" and insert --factor, so-- in place therefor.

Signed and Sealed this

Eighth Day of August, 2000

Attest:

Q. TODD DICKINSON

*Attesting Officer*   *Director of Patents and Trademarks*